United States Patent
Eguchi et al.

(10) Patent No.: US 9,878,558 B2
(45) Date of Patent: Jan. 30, 2018

(54) WATER-BASED INK FOR INKJET RECORDING

(71) Applicant: KAO CORPORATION, Tokyo (JP)

(72) Inventors: Tetsuya Eguchi, Wakayama (JP); Ryuma Mizushima, Wakayama (JP)

(73) Assignee: KAO CORPORATION, Tokyo (JP)

( * ) Notice: Subject to any disclaimer, the term of this patent is extended or adjusted under 35 U.S.C. 154(b) by 40 days.

(21) Appl. No.: 14/896,030

(22) PCT Filed: Jun. 4, 2014

(86) PCT No.: PCT/JP2014/064879
§ 371 (c)(1),
(2) Date: Dec. 4, 2015

(87) PCT Pub. No.: WO2014/196578
PCT Pub. Date: Dec. 11, 2014

(65) Prior Publication Data
US 2016/0130453 A1    May 12, 2016

(30) Foreign Application Priority Data

Jun. 6, 2013   (JP) .................. 2013-119561

(51) Int. Cl.
| | |
|---|---|
| B41J 2/21 | (2006.01) |
| C09D 11/322 | (2014.01) |
| C09D 11/107 | (2014.01) |
| C09D 11/326 | (2014.01) |
| C09D 11/10 | (2014.01) |

(52) U.S. Cl.
CPC ............. *B41J 2/2107* (2013.01); *C09D 11/10* (2013.01); *C09D 11/107* (2013.01); *C09D 11/322* (2013.01); *C09D 11/326* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ................................... 347/95–105
See application file for complete search history.

(56) References Cited

U.S. PATENT DOCUMENTS

| | | | |
|---|---|---|---|
| 3,936,303 A | 2/1976 | Shiba et al. | |
| 4,260,531 A | 4/1981 | Wachtel et al. | |
| 4,610,554 A | 9/1986 | Suzuki et al. | |
| 4,623,689 A | 11/1986 | Shintani et al. | |
| 5,271,765 A | 12/1993 | Ma | |
| 5,529,616 A | 6/1996 | Prasad | |
| 5,631,071 A * | 5/1997 | Fukunishi | B41M 3/00 347/106 |
| 5,713,993 A | 2/1998 | Grezzo Page et al. | |
| 5,755,860 A | 5/1998 | Zhu | |
| 5,852,074 A | 12/1998 | Tsutsumi et al. | |
| 5,955,185 A * | 9/1999 | Yoshino | B41M 5/5218 347/105 |
| 5,958,123 A | 9/1999 | De La Fuente | |

(Continued)

FOREIGN PATENT DOCUMENTS

| | | |
|---|---|---|
| EP | 0 719 846 A2 | 7/1996 |
| EP | 0 826 751 A2 | 3/1998 |

(Continued)

OTHER PUBLICATIONS

Japanese Office Action, dated Dec. 21, 2010, for Japanese Application No. 2005-292669, with an English translation.
Machine translation of JP-2001-329199-A dated Nov. 27, 2001.
Meylan et al, "Atom/Fragment Contribution Method for Estimating Octanol-Water Partition Coefficients," Journal of Pharmaceutical Sciences, vol. 84, No. 1, pp. 83-92, Jan. 1995.
Osha et al., "Trioctyl Phosphate MSDS," May 27, 2011, pp. 1-6.
European Patent Office Communication and extended search report issued in the corresponding European Patent Application No. 14807397.6 dated Dec. 9, 2016.

(Continued)

*Primary Examiner* — Manish S Shah
(74) *Attorney, Agent, or Firm* — Birch, Stewart, Kolasch & Birch, LLP

(57) ABSTRACT

There is provided a water-based ink for ink-jet printing which is excellent in optical density when printed on any of a high-water absorbing recording medium and a low-water absorbing recording medium, spreading of the dot size on the low-water absorbing recording medium, and rub fastness. The present invention relates to a water-based ink for ink-jet printing, including pigment-containing water-insoluble polymer particles A, water-insoluble polymer particles B, an organic solvent C and water, in which the water-insoluble polymer particles A are constituted of a water-insoluble polymer (a) including a constitutional unit derived from an ionic monomer, a constitutional unit derived from an aromatic ring-containing hydrophobic monomer and a constitutional unit derived from a specific hydrophilic nonionic monomer; the constitutional unit derived from the hydrophilic nonionic monomer is present in an amount of not less than 13% by mass and not more than 45% by mass on the basis of whole constitutional units in the water-insoluble polymer (a); the organic solvent C includes one or more organic solvents having a boiling point of 90° C. or higher in which a weighted mean boiling point of the organic solvent C which is weighted by contents (% by mass) of the respective organic solvents in the organic solvent C is 250° C. or lower; and a content of the organic solvent C in the water-based ink is not less than 20% by mass.

19 Claims, No Drawings

(56) References Cited

U.S. PATENT DOCUMENTS

| | | |
|---|---|---|
| 6,133,316 A | 10/2000 | Østensen et al. |
| 6,153,001 A | 11/2000 | Suzuki et al. |
| 6,211,265 B1 | 4/2001 | Ohta et al. |
| 6,232,369 B1 | 5/2001 | Ma et al. |
| 6,281,267 B2 | 8/2001 | Parazak |
| 6,319,309 B1 | 11/2001 | Lavery et al. |
| 7,803,852 B2 | 9/2010 | Doi et al. |
| 2002/0016385 A1 | 2/2002 | Nakano et al. |
| 2002/0058111 A1 | 5/2002 | Debikey et al. |
| 2003/0027892 A1 | 2/2003 | Wang et al. |
| 2003/0035149 A1 | 2/2003 | Ishikawa et al. |
| 2003/0087988 A1 | 5/2003 | Nakano et al. |
| 2003/0184629 A1 | 10/2003 | Valentini et al. |
| 2005/0282932 A1 | 12/2005 | Takizawa et al. |
| 2008/0143785 A1 | 6/2008 | Houjou |
| 2008/0238984 A1 | 10/2008 | Yahiro |
| 2009/0068359 A1 | 3/2009 | Doi et al. |
| 2009/0068361 A1 | 3/2009 | Doi et al. |
| 2010/0152367 A1 | 6/2010 | Doi et al. |
| 2011/0152442 A1* | 6/2011 | Doi ................. C09D 11/32 524/524 |
| 2011/0164086 A1 | 7/2011 | Ggoto et al. |
| 2012/0105558 A1 | 5/2012 | Li et al. |

FOREIGN PATENT DOCUMENTS

| | | |
|---|---|---|
| EP | 0 909 798 A1 | 4/1999 |
| EP | 1 088 863 A1 | 4/2001 |
| EP | 1 158 030 A2 | 11/2001 |
| EP | 1 323 789 A1 | 7/2003 |
| JP | 8-157760 A | 6/1996 |
| JP | 8-157761 A | 6/1996 |
| JP | 8-183920 A | 7/1996 |
| JP | 9-241565 A | 9/1997 |
| JP | 10-7968 A | 1/1998 |
| JP | 10-67957 A | 3/1998 |
| JP | 10-88053 A | 4/1998 |
| JP | 10-140065 A | 5/1998 |
| JP | 10-279873 A | 10/1998 |
| JP | 10-316918 A | 12/1998 |
| JP | 11-80636 A | 3/1999 |
| JP | 11-246806 A | 9/1999 |
| JP | 11-269418 A | 10/1999 |
| JP | 11-315229 A | 11/1999 |
| JP | 2001-329199 A | 11/2001 |
| JP | 2002-097396 A | 4/2002 |
| JP | 2002-294105 A | 10/2002 |
| JP | 2003-292853 A | 10/2003 |
| JP | 2004-26988 A | 1/2004 |
| JP | 2004-75759 A | 3/2004 |
| JP | 2004-115589 A | 4/2004 |
| JP | 2004-210951 A | 7/2004 |
| JP | 2005-036202 A | 2/2005 |
| JP | 2005-515289 A | 5/2005 |
| JP | 2006-282989 A | 10/2006 |
| JP | 2008-149542 A | 7/2008 |
| JP | 2008-246786 A | 10/2008 |
| JP | 2010-084116 A | 4/2010 |
| JP | 2010-222418 A | 10/2010 |
| WO | WO 03/062331 A1 | 7/2003 |
| WO | WO 2011/008813 A1 | 1/2011 |

OTHER PUBLICATIONS

International Search Report issued in PCT/JP2014/064879, dated Sep. 9, 2014.

* cited by examiner

WATER-BASED INK FOR INKJET RECORDING

FIELD OF THE INVENTION

The present invention relates to a water-based ink for ink-jet printing and an image forming method.

BACKGROUND OF THE INVENTION

In ink-jet printing methods, droplets of ink are directly projected onto a recording medium from very fine nozzles and allowed to adhere to the recording medium, to form images or characters. The ink-jet printing methods have become rapidly spread because of various advantages such as easiness of full coloration, low cost, capability of using a plain paper as the recording medium, non-contact with printed images or characters, etc.

In recent years, in order to impart a good weathering resistance and a good water resistance to printed matters, an ink containing a pigment as a colorant has been extensively used.

For example, JP 2001-329199A discloses an aqueous ink composition that is capable of exhibiting excellent water resistance, rub fastness and highlighter fastness, and includes an aqueous medium, polymer particles A obtained by incorporating a pigment into a water-insoluble polymer and/or a self-dispersible pigment, and polymer particles B, in which methoxypolyethylene glycol (meth)acrylate is used as a monomer for the polymer.

JP 2006-282989A discloses a water-based ink for ink-jet printing which is capable of not only satisfying a high optical density but also exhibiting an excellent highlighter fastness, and includes a water dispersion containing colorant-containing polymer particles (A-1), polymer particles (B) and a water-insoluble organic compound.

JP 2010-84116A discloses an ink for ink-jet printing which is excellent in quality of images printed on a plain paper, suitability for high-speed printing, etc., and includes a water dispersion of pigment-containing water-insoluble vinyl polymer particles, a water-soluble organic solvent and water, in which a residue of the ink which is obtained by allowing the ink to stand until substantially no further change in mass of the ink occurs has a viscosity not more than a specific value, and an ink preparation whose pH value is controlled to 7 has a viscosity of not less than 500 mPa·s.

On the other hand, there is an increasing demand for printed matters printed on recording media for commercial printing use including not only high-absorptive recording media such as the aforementioned conventional plain paper and a so-called copy paper, but also a low-liquid absorbing coated paper such as an offset coated paper or a non-liquid absorbing resin film such as a polyvinyl chloride resin film, a polypropylene resin film and a polyester resin film.

It is known that when images or characters are printed on the low-liquid absorbing or non-liquid absorbing recording media by the ink-jet printing methods, there tend to occur problems such as slow absorption of liquid components, prolonged drying time owing to poor absorption, and deterioration in rub fastness in an early stage of printing.

Also, if the amount of the solvent in the ink is reduced to shorten the drying time, there is such a tendency that the ink fails to spread over the recording medium to cause formation of spots in images and deterioration in ejection property of the ink. To solve these problems, the ink-jet printing method using a recording medium having an ink absorbing layer has been proposed.

For example, JP 2005-36202A discloses an ink-jet printing method using a water-based ink containing colorant-containing water-insoluble vinyl polymer particles and a void-type glossy medium in which the water-insoluble vinyl polymer is produced from a polyoxyethylene chain-containing (meth)acrylate monomer, a salt-forming group-containing monomer and a hydrophobic monomer.

SUMMARY OF THE INVENTION

The present invention relates to the following aspects [1] and [2].

[1] A water-based ink for ink-jet printing, including pigment-containing water-insoluble polymer particles A, water-insoluble polymer particles B, an organic solvent C and water, the water-insoluble polymer particles A being constituted of a water-insoluble polymer (a) including a constitutional unit derived from an ionic monomer (a-1), a constitutional unit derived from an aromatic ring-containing hydrophobic monomer (a-2) and a constitutional unit derived from a hydrophilic nonionic monomer (a-3) represented by the following formula (1), the constitutional unit derived from the hydrophilic nonionic monomer (a-3) being present in an amount of not less than 13% by mass and not more than 45% by mass on the basis of whole constitutional units in the water-insoluble polymer (a);

the organic solvent C including one or more organic solvents having a boiling point of 90° C. or higher, in which a weighted mean boiling point of the organic solvent C which is weighted by contents (% by mass) of the respective organic solvents in the organic solvent C is 250° C. or lower; and a content of the organic solvent C in the water-based ink being not less than 20% by mass.

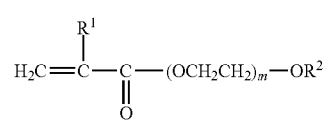

(1)

wherein $R^1$ is a hydrogen atom or a methyl group; $R^2$ is a hydrogen atom, an alkyl group having not less than 1 and not more than 20 carbon atoms or a phenyl group whose hydrogen atom may be substituted with an alkyl group having not less than 1 and not more than 9 carbon atoms; and m represents an average molar number of addition of ethyleneoxy groups and is a number of not less than 2 and not more than 6.

[2] An image forming method in which the water-based ink according to the above aspect [1] is ejected onto an ink-jet recording medium to form images thereon, said method including:

Step A of forming images on a recording medium having a water absorption of not less than 10 g/m² as measured under the condition that a contact time between the recording medium and the ink is 100 ms; and Step B of forming images on a recording medium having a water absorption of not less than 0 g/m² and less than 10 g/m² as measured under the condition that a contact time between the recording medium and the ink is 100 ms, in which the water-based ink used in the step A has the same composition as that of the water-based ink used in the step B.

DETAILED DESCRIPTION OF THE INVENTION

The conventional technologies as described in the above patent literatures aim at printing on a plain paper or an ink-jet paper and therefore have failed to obtain printed images or characters capable of satisfying good optical density and rub fastness when commercially used for printing on the aforementioned low-liquid absorbing coated paper or non-liquid absorbing synthetic resin film.

The present invention relates to an ink for ink-jet printing which is excellent in optical density when printed on any of a high-water absorbing (high-absorptive) recording medium and a low-water absorbing recording medium, spreading of the dot size on the low-water absorbing recording medium, and rub fastness.

Meanwhile, the term "high-water absorbing recording medium" as used in the present invention is intended to mean a recording medium having a water absorption of not less than 10 g/m² as measured under the condition that a contact time between the recording medium and the ink is 100 ms, whereas the term "low-water absorbing recording medium" as used in the present invention is intended to include both concepts of a low-water absorbing recording medium and a non-water absorbing recording medium, and mean a recording medium having a water absorption of not less than 0 g/m² and less than 10 g/m² as measured under the condition that a contact time between the recording medium and the ink is 100 ms.

The present inventors have noticed a water-based ink including pigment-containing water-insoluble polymer particles, another water-insoluble polymer particles and an organic solvent, and have found that by controlling the content of a constitutional unit derived from a hydrophilic nonionic monomer having a specific structure which constitutes the water-insoluble polymer to a specific range, and using the water-insoluble polymer in combination with the organic solvent having a specific boiling point to prepare the ink, it is possible to solve and overcome the above conventional problems.

That is, the present invention relates to the following aspects [1] and [2].

[1] A water-based ink for ink-jet printing, including pigment-containing water-insoluble polymer particles A, water-insoluble polymer particles B, an organic solvent C and water, the water-insoluble polymer particles A being constituted of a water-insoluble polymer (a) including a constitutional unit derived from an ionic monomer (a-1), a constitutional unit derived from an aromatic ring-containing hydrophobic monomer (a-2) and a constitutional unit derived from a hydrophilic nonionic monomer (a-3) represented by the following formula (1), the constitutional unit derived from the hydrophilic nonionic monomer (a-3) being present in an amount of not less than 13% by mass and not more than 45% by mass on the basis of whole constitutional units in the water-insoluble polymer (a);

the organic solvent C including one or more organic solvents having a boiling point of 90° C. or higher, in which a weighted mean boiling point of the organic solvent C which is weighted by contents (% by mass) of the respective organic solvents in the organic solvent C is 250° C. or lower; and a content of the organic solvent C in the water-based ink being not less than 20% by mass.

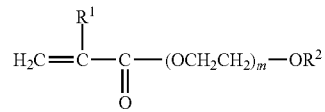

wherein $R^1$ is a hydrogen atom or a methyl group; $R^2$ is a hydrogen atom, an alkyl group having not less than 1 and not more than 20 carbon atoms or a phenyl group whose hydrogen atom may be substituted with an alkyl group having not less than 1 and not more than 9 carbon atoms; and m represents an average molar number of addition of ethyleneoxy groups and is a number of not less than 2 and not more than 6.

[2] An image forming method in which the water-based ink according to the above aspect [1] is ejected onto an ink-jet recording medium to form images thereon, said method including:

Step A of forming images on a recording medium having a water absorption of not less than 10 g/m² as measured under the condition that a contact time between the recording medium and the ink is 100 ms; and Step B of forming images on a recording medium having a water absorption of not less than 0 g/m² and less than 10 g/m² as measured under the condition that a contact time between the recording medium and the ink is 100 ms, in which the water-based ink used in the step A has the same composition as that of the water-based ink used in the step B.

According to the present invention, there is provided an ink for ink-jet printing which is excellent in optical density when printed on any of a high-water absorbing recording medium and a low-water absorbing recording medium, spreading of the dot size on the low-water absorbing recording medium, and rub fastness.

[Water-Based Ink for Ink-Jet Printing]

The water-based ink for ink-jet printing according to the present invention is characterized by including pigment-containing water-insoluble polymer particles A, water-insoluble polymer particles B, an organic solvent C and water, the water-insoluble polymer particles A being constituted of a water-insoluble polymer (a) including a constitutional unit derived from an ionic monomer (a-1), a constitutional unit derived from an aromatic ring-containing hydrophobic monomer (a-2) and a constitutional unit derived from a hydrophilic nonionic monomer (a-3) represented by the above formula (1), the constitutional unit derived from the hydrophilic nonionic monomer (a-3) being present in an amount of not less than 13% by mass and not more than 45% by mass on the basis of whole constitutional units in the water-insoluble polymer (a);

the organic solvent C including one or more organic solvents having a boiling point of 90° C. or higher, in which a weighted mean boiling point of the organic solvent C which is weighted by contents (% by mass) of the respective organic solvents in the organic solvent C is 250° C. or lower; and a content of the organic solvent C in the water-based ink being not less than 20% by mass.

The water-based ink for ink-jet printing according to the present invention can provide printed images or characters which are excellent in optical density when printed on any of a high-water absorbing recording medium and a low-water absorbing recording medium, spreading of the dot size on a low-water absorbing recording medium, and rub fastness. The reason why the above advantages can be attained by the present invention is considered as follows, though not clearly determined yet.

The pigment-containing water-insoluble polymer particles A contain a specific amount of the constitutional unit derived from the hydrophilic nonionic polymer (a-3) represented by the above formula (1), and therefore can be prevented from suffering from aggregation thereof owing to steric repulsion of the hydrophilic nonionic monomer (a-3) in water and the organic solvent C having a boiling point of 90° C. or higher in the course of printing images or characters of the ink on a low-water absorbing recording medium and allowing a solvent component of the ink to slowly absorb in the recording medium. As a result, it is considered that the increase in viscosity of the ink when dried is suppressed, spreading of the dot size of the ink on a low-water absorbing recording medium is promoted, and the resulting printed images or characters are enhanced in optical density. In addition, the ink can be prevented from suffering from increase in viscosity and therefore is also excellent in ejection property.

In addition, the organic solvent C having a boiling point of 250° C. or lower as a weighed mean value thereof is used in a specific amount or more, so that the drying velocity of the organic solvent itself on a low-water absorbing recording medium becomes high. On the other hand, the water-insoluble polymer particles can be prevented from suffering from aggregation owing to steric repulsion of the hydrophilic nonionic monomer (a-3). As a result, it is considered that the organic solvent is inhibited from being incorporated between the aggregated particles, and drying of the organic solvent in the ink is not disturbed, so that the resulting printed images or characters of the ink can be enhanced in rub fastness.

Further, the pigment-containing water-insoluble polymer particles A exhibit weak steric repulsion owing to a relatively short ethyleneoxide chain of the constitutional unit derived from the hydrophilic nonionic polymer (a-3) represented by the above formula (1). Therefore, the ink undergoes adequate aggregation in the course of rapid absorption of the solvent component therein on a high-water absorbing recording medium and is allowed to remain on the paper. As a result, it is considered that the ink is also excellent in optical density on the high-water absorbing recording medium.

<Water-Based Ink for Ink-Jet Printing>

The water-based ink for ink-jet printing according to the present invention includes the pigment-containing water-insoluble polymer particles A, the water-insoluble polymer particles B, the organic solvent C and water.

Meanwhile, the term "water-based" as used herein means that water has a largest content among components of a medium contained in the ink, and the medium used for the ink may be constituted of not only water solely but also a mixed solvent containing water and one or more kinds of organic solvents.

[Pigment-Containing Water-Insoluble Polymer Particles A]
(Pigment)

The pigment used in the present invention may be either an inorganic pigment or an organic pigment.

Examples of the inorganic pigment include carbon blacks and metal oxides. In particular, carbon blacks are preferably used for black water-based inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of the organic pigment used in the present invention is not particularly limited, and there may be used any chromatic color pigment having a yellow color, a magenta color, a cyan color, a red color, a blue color, an orange color, a green color, etc.

(Water-Insoluble Polymer (a))

The water-insoluble polymer (a) constituting the pigment-containing water-insoluble polymer particles A is used for dispersing the pigment in an aqueous medium and maintaining the resulting dispersion in a stable state, and contains a constitutional unit derived from an ionic monomer (a-1), a constitutional unit derived from an aromatic ring-containing hydrophobic monomer (a-2) and a constitutional unit derived from a hydrophilic nonionic monomer (a-3) represented by the formula (1).

The water-insoluble polymer (a) may be produced by subjecting the ionic monomer (a-1), the aromatic ring-containing hydrophobic monomer (a-2) and the hydrophilic nonionic monomer (a-3) represented by the formula (1) to addition polymerization by conventionally known methods.

The ionic monomer (a-1) is used as a monomer component of the water-insoluble polymer (a) upon producing the below-mentioned "water dispersion of the pigment-containing water-insoluble polymer particles A" (hereinafter also referred to as a "pigment water dispersion") from the viewpoint of enhancing the dispersion stability of the pigment water dispersion and the storage stability of the water-based ink.

Examples of the ionic monomer (a-1) include anionic monomers and cationic monomers. Among these monomers, from the viewpoint of enhancing the dispersion stability of the pigment water dispersion and the storage stability of the water-based ink as well as from the viewpoint of improving the ejecting property of the ink, preferred are anionic monomers.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid and 3-sulfopropyl(meth)acrylate. Meanwhile, the term "(meth)acrylate" means both a methacrylate and an acrylate, and is hereinafter defined in the same way.

Specific examples of the phosphoric acid monomers include vinylphosphonic acid, vinyl phosphate, bis(methacryloxyethyl)phosphate, diphenyl-2-acryloyloxyethyl phosphate and diphenyl-2-methacryloyloxyethyl phosphate.

Among the above anionic monomers, from the viewpoint of enhancing the dispersion stability of the pigment water dispersion and the storage stability of the water-based ink, preferred are the carboxylic acid monomers, more preferred are acrylic acid and methacrylic acid, and even more preferred is methacrylic acid.

As the cationic monomer, there may be mentioned at least one monomer selected from the group consisting of unsaturated tertiary amine-containing vinyl monomers and unsaturated ammonium salt-containing vinyl monomers.

Examples of the unsaturated tertiary amine-containing vinyl monomers include N,N-dimethylaminoethyl(meth)acrylate, N,N-dimethylaminopropyl(meth)acrylate, N,N-diethylaminoethyl(meth)acrylate, N,N-dimethylaminopropyl (meth)acrylamide, N,N-dimethylarylamines, vinyl pyrrolidone, 2-vinyl pyridine, 4-vinyl pyridine, 2-methyl-6-vinyl pyridine and 5-ethyl-2-vinyl pyridine. These unsaturated tertiary amine-containing vinyl monomers may be used alone or in the form of a mixture of any two or more thereof.

Examples of the unsaturated ammonium salt-containing vinyl monomers include a quaternarized product of N,N-dimethylaminoethyl(meth)acrylate, a quaternarized product of N,N-diethylaminoethyl(meth)acrylate and a quaternarized product of N,N-dimethylaminopropyl(meth)acrylate. These unsaturated ammonium salt-containing vinyl monomers may be used alone or in the form of a mixture of any two or more thereof.

Of these cationic monomers, preferred are N,N-dimethylaminoethyl(meth)acrylate, N,N-dimethylaminopropyl (meth)acrylamide and vinyl pyrrolidone.

The aromatic ring-containing hydrophobic monomer (a-2) is used as a monomer component of the water-insoluble polymer (a) from the viewpoint of enhancing the dispersion stability of the pigment water dispersion and the storage stability of the water-based ink as well as from the viewpoint of improving the rub fastness of the ink when printed on a low-water absorbing recording medium.

The aromatic ring-containing hydrophobic monomer (a-2) may be at least one monomer selected from the group consisting of a styrene-based monomer, an aromatic group-containing (meth)acrylate and a styrene-based macromonomer.

As the styrene-based monomer, from the viewpoint of enhancing the dispersion stability of the pigment water dispersion and the storage stability of the water-based ink, preferred are styrene and 2-methyl styrene, and more preferred is styrene.

As the aromatic group-containing (meth)acrylate, from the viewpoint of enhancing the dispersion stability of the pigment water dispersion and the storage stability of the water-based ink as well as from the viewpoint of improving the rub fastness of the ink when printed on a low-water absorbing recording medium, preferred are benzyl(meth)acrylate and phenoxyethyl(meth)acrylate, and more preferred is benzyl(meth)acrylate.

The styrene-based macromonomer is a compound having a number-average molecular weight of not less than 500 and not more than 100,000 which contains a polymerizable functional group at one terminal end thereof. The number-average molecular weight of the styrene-based macromonomer is preferably not less than 1,000 and not more than 10,000 from the viewpoint of enhancing the dispersion stability of the pigment water dispersion and the storage stability of the water-based ink as well as from the viewpoint of improving the rub fastness of the ink when printed on a low-water absorbing recording medium. Meanwhile, the number-average molecular weight may be measured by gel permeation chromatography using chloroform containing 1 mmol/L of dodecyldimethylamine as a solvent and polystyrene as a reference standard substance.

Examples of the commercially available styrene-based macromonomer include AS-6(S), AN-6(S) and HS-6(S) (tradenames: all available from Toagosei Co., Ltd.), etc.

As the aromatic ring-containing hydrophobic monomer (a-2), from the viewpoint of enhancing the dispersion stability of the pigment water dispersion and the storage stability of the water-based ink as well as from the viewpoint of improving the rub fastness of the ink when printed on a low-water absorbing recording medium, preferred is one or two compounds selected from the group consisting of the aromatic group-containing (meth)acrylate and the styrene-based macromonomer, more preferred is the combination of the aromatic group-containing (meth)acrylate and the styrene-based macromonomer, and even more preferred is the combination of benzyl(meth)acrylate and the styrene-based macromonomer.

The hydrophilic nonionic monomer represented by the formula (1) is used as a monomer component of the water-insoluble polymer (a) from the viewpoints of enhancing the optical density of the ink when printed on a high-water absorbing recording medium, reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

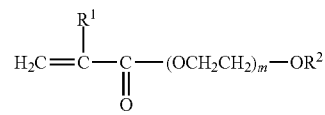

(1)

wherein $R^1$ is a hydrogen atom or a methyl group; $R^2$ is a hydrogen atom, an alkyl group having not less than 1 and not more than 20 carbon atoms or a phenyl group whose hydrogen atom may be substituted with an alkyl group having not less than 1 and not more than 9 carbon atoms; and m represents an average molar number of addition of ethyleneoxy groups and is a number of not less than 2 and not more than 6.

In the above formula (1), $R^1$ is a hydrogen atom or a methyl group, and preferably a methyl group, from the viewpoint of enhancing the dispersion stability of the pigment water dispersion and the storage stability of the water-based ink.

$R^2$ is a hydrogen atom, an alkyl group having not less than 1 and not more than 20 carbon atoms or a phenyl group whose hydrogen atom may be substituted with an alkyl group having not less than 1 and not more than 9 carbon atoms. $R^2$ is preferably a hydrogen atom or an alkyl group having not less than 1 and not more than 20 carbon atoms, more preferably an alkyl group having not less than 1 and not more than 3 carbon atoms and even more preferably a methyl group, from the viewpoint of enhancing the dispersion stability of the pigment water dispersion and the storage stability of the water-based ink.

In the above formula (1), m is a number of not less than 2 and not more than 6. From the viewpoints of enhancing the optical density of the ink when printed on a high-water absorbing recording medium, reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink, m is preferably not less than 3, and is also preferably not more than 5, and m is more preferably 4.

Preferred examples of the monomer (a-3) represented by the above formula (1) include at least one monomer selected from the group consisting of polyethylene glycol mono (meth)acrylate, methoxy polyethylene glycol mono(meth) acrylate, octoxy polyethylene glycol mono(meth)acrylate and stearoxypolyethylene glycol mono(meth)acrylate. Among these monomers, more preferred is methoxy polyethylene glycol mono(meth)acrylate.

Specific examples of the commercially available monomer represented by the above formula (1) include "NK Ester TM-20G", "NK Ester TM-23G", "NK Ester TM-40G" and "NK Ester TM-60G" all available from Shin-Nakamura Chemical Co., Ltd., "PE-200" available from NOF Corporation, and "LIGHT ESTER MTG" available from Kyoeisha Chemical Co., Ltd.

The water-insoluble polymer (a) used in the present invention may also be produced using other monomers in addition to the ionic monomer (a-1), the aromatic ring-containing hydrophobic monomer (a-2) and the hydrophilic nonionic monomer (a-3) represented by the formula (1) unless the desired effects of the present invention are adversely affected.

Examples of the other monomers include alkyl(meth)acrylates having 1 to 22 carbon atoms such as methyl(meth)acrylate and 2-ethylhexyl(meth)acrylate; hydroxyalkyl (meth)acrylates such as 2-hydroxyethyl(meth)acrylate and 3-hydroxyethyl(meth)acrylate; and silicone-based macromonomers such as organopolysiloxanes having a polymerizable functional group at one terminal end thereof.

The contents of the above monomers (a-1), (a-2) and (a-3) in a mixture containing these monomers (hereinafter also referred to merely as a "monomer mixture") (contents of non-neutralized components; hereinafter defined in the same way) upon production of the water-insoluble polymer (a), or the contents of the constitutional units derived from the monomers (a-1), (a-2) and (a-3) in the water-insoluble polymer (a) produced are as follows.

The content of the ionic monomer (a-1) is preferably not less than 3% by mass, more preferably not less than 5% by mass and even more preferably not less than 8% by mass, and is also preferably not more than 40% by mass, more preferably not more than 25% by mass and even more preferably not more than 20% by mass from the viewpoint of enhancing the dispersion stability of the pigment water dispersion and the storage stability of the water-based ink.

The content of the aromatic ring-containing hydrophobic monomer (a-2) is preferably not less than 20% by mass, more preferably not less than 40% by mass and even more preferably not less than 50% by mass, and is also preferably not more than 80% by mass, more preferably not more than 75% by mass and even more preferably 70% by mass from the viewpoint of enhancing the dispersion stability of the pigment water dispersion and the storage stability of the water-based ink as well as from the viewpoint of improving the rub fastness of the ink when printed on a low-water absorbing recording medium.

The content of the styrene-based macromonomer used as the monomer (a-2) is preferably not less than 5% by mass, more preferably not less than 8% by mass, and even more preferably not less than not less than 10% by mass, and is also preferably not more than 25% by mass, more preferably not more than 20% by mass, even more preferably not more than 15% by mass, and further even more preferably not more than 12% by mass, from the viewpoint of enhancing the dispersion stability of the pigment water dispersion and the storage stability of the water-based ink as well as from the viewpoint of improving the rub fastness of the ink when printed on a low-water absorbing recording medium.

The content of the hydrophilic nonionic monomer (a-3) is preferably not less than 13% by mass, more preferably not less than 15% by mass, and even more preferably not less than 18% by mass, and is also preferably not more than 45% by mass, more preferably not more than 40% by mass, and even more preferably not more than 38% by mass, from the viewpoints of enhancing the optical density of the ink when printed on a high-water absorbing recording medium, reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

The mass ratio of the component (a-1) to a sum of the component (a-2) and the component (a-3) {component (a-1)/[component (a-2)+component (a-3)]} is preferably not less than 0.03, more preferably not less than 0.05 and even more preferably not less than 0.10, and is also preferably not more than 0.50, more preferably not more than 0.30 and even more preferably not more than 0.20 from the viewpoint of enhancing the dispersion stability of the pigment water dispersion and the storage stability of the water-based ink.

(Production of Water-Insoluble Polymer (a))

The water-insoluble polymer (a) may be produced by copolymerizing the aforementioned monomer mixture by known polymerization methods. Among the polymerization methods, preferred is a solution polymerization method.

The organic solvent (a) used in the solution polymerization method is not particularly limited, and is preferably at least one compound selected from the group consisting of ketones having not less than 4 and not more than 8 carbon atoms, alcohols, ethers and esters from the viewpoint of enhancing productivity of the below-mentioned water dispersion of the pigment-containing water-insoluble polymer particles A. Of these compounds, more preferred are ketones having not less than 4 and not more than 8 carbon atoms, and even more preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile) or the like.

As the chain transfer agent, preferred are mercaptans, and more preferred is 2-mercaptoethanol or the like.

The preferred polymerization conditions may vary depending upon the kind of polymerization initiator used, etc. The polymerization temperature is preferably not lower than 50° C. and not higher than 90° C., and the polymerization time is preferably not shorter than 1 h and not longer than 20 h. Further, the polymerization is preferably conducted in an inert gas atmosphere such as nitrogen gas atmosphere and argon.

After completion of the polymerization reaction, the polymer thus produced may be isolated from the reaction solution by a known method such as reprecipitation and removal of solvent by distillation. The thus obtained polymer may be subjected to reprecipitation, membrane separation, chromatography, extraction, etc., for removing unreacted monomers, etc., therefrom.

The water-insoluble polymer (a) is preferably used as such in the form of a polymer solution without removing the organic solvent (a) used in the polymerization reaction therefrom in order to use the organic solvent (a) as the below-mentioned organic solvent (b) from the viewpoint of enhancing productivity of the water dispersion of the pigment-containing water-insoluble polymer particles A.

The solid content of the solution of the water-insoluble polymer (a) is preferably not less than 30% by mass and more preferably not less than 40% by mass, and is also preferably not more than 60% by mass and more preferably not more than 50% by mass from the viewpoint of enhancing productivity of the water dispersion of the pigment-containing water-insoluble polymer particles A.

The weight-average molecular weight of the water-insoluble polymer (a) used in the present invention is preferably not less than 10,000, more preferably not less than 15,000 and even more preferably not less than 20,000 from the viewpoint of enhancing the dispersion stability of the pigment water dispersion and the storage stability of the water-based ink, and is also preferably not more than 150,000, more preferably not more than 100,000, even more preferably not more than 60,000 and further even more preferably not more than 40,000 from the viewpoints of enhancing the optical density of the ink when printed on a high-water absorbing recording medium, reducing the viscosity of the ink upon evaporating the solvent C therefrom, and increasing the dot size of the ink and enhancing the optical density of the ink when printed on a low-water absorbing recording medium, as well as from the viewpoint of improving the storage stability and ejection property of the water-based ink. Meanwhile, the weight-average molecular weight of the water-insoluble polymer (a) may be measured by the method described in Examples below.

(Production of Pigment-Containing Water-Insoluble Polymer Particles A)

The pigment-containing water-insoluble polymer particles A are preferably used in the form of a pigment water dispersion, and compounded in the water-based ink for ink-jet printing from the viewpoint of enhancing productivity of the water-based ink.

The water dispersion of the pigment-containing water-insoluble polymer particles A (pigment water dispersion) may be produced by the process including the following steps (1) and (2).

Step (1): subjecting a mixture of the water-insoluble polymer (a), an organic solvent (b), a pigment and water (hereinafter also referred to as a "pigment mixture") to dispersion treatment to obtain a dispersion treatment product; and Step (2): removing the organic solvent (b) from the dispersion treatment product obtained in the step (1) to obtain a pigment water dispersion.

<Step (1)>

In the step (1), the mixture of the water-insoluble polymer (a), the organic solvent (b), the pigment and water (pigment mixture) was subjected to dispersion treatment to obtain the dispersion treatment product.

In the step (1), first, the water-insoluble polymer (a), the organic solvent (b), the pigment and water, if required, together with a neutralizing agent, a surfactant and the like, are preferably mixed with each other to obtain the pigment mixture. The order of addition of the respective components is not particularly limited, and it is preferred that the water-insoluble polymer (a), the organic solvent (b), the neutralizing agent, water and the pigment are successively added in this order.

(Organic Solvent (b))

The organic solvent (b) is not particularly limited, and is preferably selected from aliphatic alcohols having not less than 1 and not more than 3 carbon atoms, ketones having not less than 4 and not more than 8 carbon atoms, ethers, esters and the like. Of these organic solvents, from the viewpoint of improving the wettability to the pigment, the solubility of the water-insoluble polymer (a) and the adsorbing property of the water-insoluble polymer (a) to the pigment, more preferred are ketones having not less than 4 and not more than 8 carbon atoms, even more preferred are methyl ethyl ketone and methyl isobutyl ketone, and further even more preferred is methyl ethyl ketone.

The mass ratio of the water-insoluble polymer (a) to the organic solvent (b) [water-insoluble polymer (a)/organic solvent (b)] is preferably not less than 0.10, more preferably not less than 0.15 and even more preferably not less than 0.20, and is also preferably not more than 0.60, more preferably not more than 0.50 and even more preferably not more than 0.40 from the viewpoint of improving the wettability to the pigment and the adsorbing property of the water-insoluble polymer (a) to the pigment.

(Neutralizing Agent)

In the present invention, from the viewpoint of enhancing the dispersion stability of the pigment water dispersion as well as the storage stability and ejection property of the water-based ink, there may be used a neutralizing agent. When using the neutralizing agent, the pH value of the pigment water dispersion is preferably controlled to not less than 7 and more preferably not less than 7.5, and is also preferably controlled to not more than 11 and more preferably not more than 9.5.

Examples of the neutralizing agent include hydroxides of alkali metals, ammonia and organic amines.

Specific examples of the hydroxides of alkali metals include lithium hydroxide, sodium hydroxide, potassium hydroxide and cesium hydroxide. Among these hydroxides of alkali metals, preferred is sodium hydroxide.

Specific examples of the organic amines include trimethylamine, ethylamine, diethylamine, triethylamine and triethanolamine.

As the neutralizing agent, from the viewpoint of enhancing the dispersion stability of the pigment water dispersion as well as the storage stability and ejection property of the water-based ink, preferred are the hydroxides of alkali metals and ammonia, and more preferred is the combination of sodium hydroxide and ammonia.

The neutralizing agent is preferably used in the form of an aqueous neutralizing agent solution from the viewpoint of accelerating neutralization of the polymer in a sufficient and uniform manner. From the same viewpoints, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The mass ratio of the aqueous neutralizing agent solution to the organic solvent (b) [aqueous neutralizing agent solution/organic solvent (b)] is preferably not less than 0.01, more preferably not less than 0.05 and even more preferably not less than 0.10, and is also preferably not more than 0.50, more preferably not more than 0.30 and even more preferably not more than 0.20 from the viewpoint of accelerating adsorption of the water-insoluble polymer (a) to the pigment and neutralization of the polymer, enhancing the dispersion stability of the pigment water dispersion and the storage stability of the water-based ink, suppressing formation of coarse particles, and improving the ejection property of the water-based ink.

The neutralizing agent and the aqueous neutralizing agent solution may be respectively used alone or in the form of a mixture of any two or more kinds thereof.

The degree of neutralization of the water-insoluble polymer (a) is preferably not less than 30 mol %, more preferably not less than 40 mol % and even more preferably not less than 50 mol %, and is also preferably not more than 300 mol %, more preferably not more than 200 mol % and even more preferably not more than 150 mol % from the viewpoint of enhancing the dispersion stability of the pigment water dispersion and the storage stability of the water-based ink, suppressing formation of coarse particles, and improving the ejection property of the water-based ink.

The degree of neutralization of the polymer by the hydroxides of alkali metals among the above neutralizing agents is preferably not less than 30 mol %, more preferably not less than 40 mol % and even more preferably not less than 50 mol %, and is also preferably not more than 150 mol %, more preferably not more than 125 mol % and even more preferably not more than 100 mol %.

The degree of neutralization of the polymer by the neutralizing agent means the value obtained by dividing a mole equivalent amount of the neutralizing agent by a molar amount of an anionic group in the water-insoluble polymer (a).

(Contents of Respective Components, etc.)

The content of the pigment in the pigment mixture is preferably not less than 10% by mass, more preferably not less than 12% by mass and even more preferably not less than 15% by mass, and is also preferably not more than 30% by mass, more preferably not more than 25% by mass and even more preferably not more than 20% by mass from the viewpoint of enhancing the dispersion stability of the pigment water dispersion and the storage stability and ejection property of the water-based ink as well as from the viewpoint of improving productivity of the pigment water dispersion.

The content of the water-insoluble polymer (a) in the pigment mixture is preferably not less than 2.0% by mass, more preferably not less than 4.0% by mass and even more preferably not less than 5.0% by mass, and is also preferably not more than 15% by mass, more preferably not more than 10% by mass and even more preferably not more than 8.0% by mass from the viewpoint of enhancing the dispersion stability of the pigment water dispersion and the storage stability and ejection property of the water-based ink.

The content of the organic solvent (b) in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass from the viewpoint of improving the wettability to the pigment and the adsorbing property of the water-insoluble polymer (a) to the pigment.

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass from the viewpoint of enhancing the dispersion stability of the pigment water dispersion as well as from the viewpoint of improving productivity of the pigment water dispersion.

The mass ratio of the pigment to the water-insoluble polymer (a) [pigment/water-insoluble polymer (a)] is preferably not less than 30/70, more preferably not less than 50/50 and even more preferably not less than 70/30, and is also preferably not more than 90/10, more preferably not more than 85/15, and even more preferably not more than 80/20, from the viewpoints of reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink. Thus, the mass ratio of the pigment to the water-insoluble polymer (a) [pigment/water-insoluble polymer (a)] is preferably from 30/70 to 90/10, more preferably from 50/50 to 85/15, and even more preferably from 70/30 to 80/20, from the viewpoints of reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

(Dispersion of Pigment Mixture)

In the step (1), the pigment mixture is further dispersed to obtain a dispersion treatment product. The dispersing method for obtaining the dispersion treatment product in the step (1) is not particularly limited. The pigment particles may be atomized into fine particles having a desired average particle size only by a substantial dispersion treatment. Preferably, the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step (1) is preferably not lower than 0° C., and is also preferably not higher than 40° C., more preferably not higher than 30° C. and even more preferably not higher than 20° C. The dispersing time is preferably not shorter than 0.5 h and more preferably not shorter than 1 h, and is also preferably not longer than 30 h, more preferably not longer than 10 h and even more preferably not longer than 5 h.

When subjecting the pigment mixture to the preliminary dispersion treatment, there may be used ordinary mixing or stirring devices such as anchor blades and disper blades. Of these mixing or stirring devices, preferred are high-speed stirring mixers.

The temperature used in the substantial dispersion treatment in the step (1) is preferably not lower than 0° C., and is also preferably not higher than 40° C., more preferably not higher than 30° C. and even more preferably not higher than 20° C.

As a means for applying a shear stress to the pigment mixture in the substantial dispersion treatment, there may be used, for example, kneading machines such as roll mills and kneaders, high-pressure homogenizers such as "Microfluidizer" (available from Microfluidics Corporation), and media-type dispersers such as paint shakers and beads mills. Examples of the commercially available media-type dispersers include "Ultra Apex Mill" (available from Kotobuki Industries Co., Ltd.) and "PICOMILL" (available from Asada Iron Works Co., Ltd.). These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling a pressure used in the substantial dispersion treatment or a frequency of the operation of passing the dispersion through the devices.

The pressure used in the substantial dispersion treatment is preferably not less than 60 MPa, more preferably not less than 100 MPa and even more preferably not less than 130 MPa, and is also preferably not more than 200 MPa, more preferably not more than 180 MPa and even more preferably not more than 160 MPa from the viewpoint of enhancing productivity and economy.

The frequency of the operation of passing the dispersion through the devices is preferably not less than 3, more preferably not less than 10 and even more preferably not less than 15, and is also preferably not more than 30 and more preferably not more than 25. Thus, the frequency of the operation of passing the dispersion through the devices is preferably from 3 to 30, more preferably from 10 to 25, and even more preferably from 15 to 25.

<Step (2)>

In the step (2), the organic solvent (b) is removed from the dispersion treatment product obtained in the step (1) to obtain a pigment water dispersion. The removal of the organic pigment (b) may be conducted by conventionally known methods.

From the viewpoint of suppressing generation of aggregates in the step of removing the organic solvent (b) and enhancing the dispersion stability of the pigment water dispersion as well as the storage stability and ejection property of the water-based ink, it is preferred that water is added to the dispersion treatment product obtained in the step (1) before removing the organic solvent (b) therefrom to suitably control the mass ratio of the organic solvent (b) to water (organic solvent (b)/water).

The mass ratio of the organic solvent (b) to water (organic solvent (b)/water) is preferably not less than 0.08 and more preferably not less than 0.10, and is also preferably not more than 0.40 and more preferably not more than 0.20.

The concentration of non-volatile components (solid content) in the pigment water dispersion after controlling the mass ratio of the organic solvent (b) to water (organic solvent (b)/water) is preferably not less than 5% by mass, more preferably not less than 8% by mass and even more preferably not less than 10% by mass, and is also preferably not more than 30% by mass, more preferably not more than 20% by mass and even more preferably not more than 16% by mass, from the viewpoint of suppressing generation of aggregates in the step of removing the organic solvent (b) as well as from the viewpoint of improving productivity of the pigment water dispersion. Meanwhile, a part of water contained in the pigment water dispersion may be removed simultaneously with the organic solvent (b).

Examples of the apparatus used for removing the organic solvent (b) in the step (2) include a thin film distillation apparatus such as a batch simple distillation device, a reduced pressure distillation device and a flash evaporator, a rotary distillation device and a stirring evaporator. Among these apparatuses, from the viewpoint of efficient removal of the organic solvent (b), preferred are a rotary distillation device and a stirring evaporator. In the case where the organic solvent is removed at one time from the dispersion treatment product which is present in an amount as small as 5 kg or less, the rotary distillation device is preferably used, whereas in the case where the organic solvent is removed at one time from the dispersion treatment product which is present in an amount as large as more than 5 kg, the stirring evaporator is preferably used. Among the rotary distillation devices, more preferred is a rotary reduced pressure distillation device such as a rotary evaporator. Whereas, among the stirring evaporators, more preferred is an agitated tank thin film evaporator.

The temperature of the dispersion treatment product upon removal of the organic solvent (b) may be appropriately selected depending upon the kind of organic solvent (b) to be removed. The temperature of the dispersion treatment product upon removal of the organic solvent (b) as measured under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The pressure of the reaction system upon removal of the organic solvent (b) is preferably not less than 0.01 MPa, more preferably not less than 0.02 MPa and even more preferably not less than 0.05 MPa, and is also preferably not more than 0.5 MPa, more preferably not more than 0.2 MPa and even more preferably not more than 0.1 MPa.

The time required for removal of the organic solvent (b) is preferably not shorter than 1 h, more preferably not shorter than 2 h and even more preferably not shorter than 5 h, and is also preferably not longer than 24 h, more preferably not longer than 12 h and even more preferably not longer than 10 h.

The removal of the organic solvent (b) is continued until the solid content of the resulting concentrated dispersion treatment product reaches preferably not less than 10% by mass and more preferably not less than 20% by mass, and also until the solid content of the concentrated dispersion treatment product reaches preferably not more than 35% by mass and more preferably not more than 30% by mass.

The thus obtained concentrated product is preferably subjected to centrifugal separation treatment to separate the concentrated product into a liquid layer portion and a solid portion, thereby recovering the liquid layer portion. The thus recovered liquid layer portion is mainly formed of a dispersion containing the pigment-containing water-insoluble polymer particles A dispersed in water, whereas the solid portion is mainly formed of coarse particles produced owing to defective dispersion or aggregation. Therefore, the pigment water dispersion is obtained from the liquid layer portion.

From the viewpoint of preventing the resulting pigment water dispersion from being dried and suffering from putrefaction thereof, a humectant such as glycerol, an antiseptic agent, a mildew-proof agent or the like is preferably added to the pigment water dispersion.

The organic solvent (b) is preferably substantially completely removed from the thus obtained pigment water dispersion. However, the residual organic solvent (b) may be present in the pigment water dispersion unless the objects and effects of the present invention are adversely affected by the residual organic solvent. The content of the residual organic solvent (b) in the resulting pigment water dispersion is preferably not more than 0.1% by mass and more preferably not more than 0.01% by mass.

The concentration of the non-volatile components (solid content) in the resulting pigment water dispersion is preferably not less than 10% by mass and more preferably not less than 15% by mass, and is also preferably not more than 30% by mass and more preferably not more than 25% by mass from the viewpoint of enhancing the dispersion stability of the pigment water dispersion as well as from the viewpoint of facilitating preparation of the water-based ink.

From the viewpoint of improving the storage stability of the pigment water dispersion and ink, the water-insoluble polymer (a) constituting the pigment-containing water-insoluble polymer particles A may be compounded in the form of a crosslinked water-insoluble polymer in the water-based ink.

In this case, the resulting pigment water dispersion is preferably mixed with a crosslinking agent and subjected to crosslinking treatment to obtain the desired pigment water dispersion.

The crosslinking agent is preferably a compound containing a functional group that is capable of reacting with an anionic group of the water-insoluble polymer (a) constituting the pigment-containing water-insoluble polymer particles A, more preferably a compound containing the 2 or more functional groups in a molecule thereof, and even more preferably a compound containing the 2 to 6 functional groups in a molecule thereof.

Preferred examples of the crosslinking agent include at least one compound selected from the group consisting of a compound containing two or more epoxy groups in a molecule thereof, a compound containing two or more oxazoline groups in a molecule thereof, and a compound containing two or more isocyanate groups in a molecule thereof. Of these compounds, preferred is a compound containing two or more epoxy groups in a molecule thereof, and more preferred is a compound containing 2 or 3 epoxy groups in a molecule thereof.

The compound containing two or more epoxy groups in a molecule thereof is preferably a glycidyl ether of a polyhydric alcohol, and more preferably trimethylol propane polyglycidyl ether.

From the viewpoint of improving the storage stability of the water-based ink, the crosslinking agent is used in such an amount that the mass ratio of the crosslinking agent to the water-insoluble polymer (a) [crosslinking agent/water-insoluble polymer (a)] is preferably not less than 1/100, more preferably not less than 3/100, and even more preferably not less than 5/100, and is also preferably not more than 30/100, more preferably not more than 25/100. and even more preferably not more than 20/100.

In addition, the crosslinking agent is used in such an amount as to react with preferably not less than 1 mmol, more preferably not less than 5 mmol and even more preferably not less than 10 mmol of an anionic group of the water-insoluble polymer (a) in terms of an amount of the anionic group per 1 g of the water-insoluble polymer (a), and also used in such an amount as to react with preferably not more than 80 mmol, more preferably not more than 60 mmol and even more preferably not more than 50 mmol of the anionic group of the water-insoluble polymer (a) in terms of an amount of the anionic group per 1 g of the water-insoluble polymer (a).

The crosslinking rate of the crosslinked water-insoluble polymer is preferably not less than 1 mol %, more preferably not less than 5 mol %, and even more preferably not less than 10 mol %, and is also preferably not more than 80 mol %, more preferably not more than 60 mol %, and even more preferably not more than 50 mol %. The crosslinking rate of the crosslinked water-insoluble polymer is the value obtained by dividing the number of moles of a reactive group of the crosslinking agent by the number of moles of a reactive group of the water-insoluble polymer (a) which can be reacted with the crosslinking agent.

In the thus-obtained pigment water dispersion, solid components of the pigment and the water-insoluble polymer (a) are dispersed in a dispersing medium containing water as a main medium.

The average particle size of the pigment-containing water-insoluble polymer particles A in the pigment water dispersion is preferably not less than nm, more preferably not less than 60 nm and even more preferably not less than 75 nm, and is also preferably not more than 150 nm, more preferably not more than 120 nm, even more preferably not more than 110 nm and further even more preferably not more than 100 nm from the viewpoint of accelerating adsorption of the water-insoluble polymer (a) to the pigment and neutralization of the polymer to improve the dispersion stability of the pigment water dispersion and, as a result, from the viewpoint of suppressing formation of coarse particles and improving the ejection property of the water-based ink, and further from the viewpoints of enhancing the optical density of the ink when printed on a high-water absorbing recording medium, reducing the viscosity of the ink upon evaporating the solvent therefrom, and increasing the dot size of the ink and enhancing the optical density of the ink when printed on a low-water absorbing recording medium.

Meanwhile, the average particle size of the pigment-containing water-insoluble polymer particles A may be measured by the method described in Examples below.

The average particle size of the pigment-containing water-insoluble polymer particles A in the water-based ink is the same as the average particle size of the particles in the pigment water dispersion, and the preferred range of the average particle size of the pigment-containing water-insoluble polymer particles A in the water-based ink is also the same as that of the average particle size of the particles in the pigment water dispersion.

(Amounts and Contents of Respective Components Compounded in Water-Based Ink for Ink-Jet Printing)

The amount of the pigment water dispersion compounded in the water-based ink is preferably not less than 10% by mass, more preferably not less than 15% by mass and even more preferably not less than 20% by mass, from the viewpoints of enhancing the optical density of the ink when printed on a high-water absorbing recording medium, and promoting drying of the ink on the surface of paper and improving the rub fastness and optical density of the ink when printed on a low-water absorbing recording medium, and is also preferably not more than 50% by mass, more preferably not more than 40% by mass and even more preferably not more than 35% by mass, from the viewpoints of reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

The content of the pigment-containing water-insoluble polymer particles A in the water-based ink is preferably not less than 1% by mass, more preferably not less than 3% by mass and even more preferably not less than 4% by mass, from the viewpoints of enhancing the optical density of the ink when printed on a high-water absorbing recording medium, and promoting drying of the ink on the surface of paper and improving the rub fastness and optical density of the ink when printed on a low-water absorbing recording medium, and is also preferably not more than 20% by mass, more preferably not more than 10% by mass and even more preferably not more than 8% by mass, from the viewpoints of reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

The content of the pigment in the water-based ink is preferably not less than 1% by mass, more preferably not less than 2% by mass and even more preferably not less than 3% by mass, from the viewpoints of enhancing the optical density of the ink when printed on a high-water absorbing recording medium, and promoting drying of the ink on the surface of paper and improving the optical density of the ink when printed on a low-water absorbing recording medium, and is also preferably not more than 15% by mass, more preferably not more than 10% by mass and even more preferably not more than 6% by mass, from the viewpoints of reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

The content of the water-insoluble polymer (a) in the water-based ink is preferably not less than 0.5% by mass, more preferably not less than 0.8% by mass and even more preferably not less than 1% by mass, from the viewpoints of enhancing the storage stability and ejection property of the water-based ink and improving the rub fastness of printed images or characters when printed on a low-water absorbing recording medium, and is also preferably not more than 6% by mass, more preferably not more than 3% by mass and even more preferably not more than 2% by mass, from the viewpoints of reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

[Water-Insoluble Polymer Particles B]

The water-based ink for ink-jet printing as used in the present invention contains the water-insoluble polymer particles B from the viewpoint of promoting drying of the ink on a recording medium for ink-jet printing (on the surface of paper) and improving the rub fastness of printed images or characters when printed on a low-water absorbing recording medium.

As the water-insoluble polymer particles B, there may be used optional water-insoluble polymer particles. The water-insoluble polymer particles B may be used in the form of a dispersion prepared by dispersing the water-insoluble polymer particles B in water as a continuous phase, and may also contain a dispersant such as a surfactant, if required. The dispersion of the water-insoluble polymer particles B also acts as a fixing emulsion for fixing ink droplets ejected from ink-jet nozzles on a recording medium and improving the optical density and rub fastness of the printed images or characters.

The water-insoluble polymer particles B may also contain a colorant such as pigments and dyes, but preferably contain no colorant from the viewpoint of improving the storage stability and ejection property of the water-based ink.

The content of the water-insoluble polymer particles B in the dispersion containing the water-insoluble polymer particles B is preferably not less than 10% by mass, more preferably not less than 20% by mass and even more preferably not less than 30% by mass, and is also preferably not more than 70% by mass, more preferably not more than 60% by mass and even more preferably not more than 55% by mass from the viewpoint of enhancing the dispersion stability of the water-insoluble polymer particles B and for convenience of formulation of the ink.

The average particle size of the water-insoluble polymer particles B in the dispersion containing the water-insoluble polymer particles B or the water-based ink is preferably not less than 10 nm, more preferably not less than nm and even more preferably not less than 50 nm, and is also preferably not more than 300 nm, more preferably not more than 150 nm and even more preferably not more than 100 nm from the viewpoint of enhancing the storage stability of the water-based ink and improving the optical density of the ink when printed on a low-water absorbing recording medium.

Meanwhile, the average particle size of the water-insoluble polymer particles B may be measured by the method described in Examples below.

Examples of the resin components of the water-insoluble polymer particles B include an acrylic resin, a styrene-based resin, a urethane-based resin, a polyester-based resin, a styrene-acrylic resin, a butadiene-based resin, a styrene-butadiene-based resin, a vinyl chloride-based resin, a vinyl acetate-based resin and an acrylic silicone-based resin. Among these resin components, preferred is an acrylic resin from the viewpoint of promoting drying of the ink on the surface of paper and improving the rub fastness of the printed images or characters when printed on a low-water absorbing recording medium.

In addition, the water-insoluble polymer particles B are preferably used in the form of a dispersion containing the water-insoluble polymer particles B from the viewpoint of enhancing productivity of the water-based ink.

The water-insoluble polymer particles B may be either an appropriately synthesized product or a commercially available product. As the synthesized product of the polymer particles B, there may be mentioned, for example, those products described in JP 2001-329199A and JP 2006-282989A.

Examples of the commercially available product of the water-insoluble polymer particles B in the form of a dispersion include acrylic resins such as "Neocryl A1127" (anionic self-crosslinked aqueous acrylic resin available from DSM NeoResins, Inc.) and "JONCRYL 390" (available from BASF Japan, Ltd.); styrene-acrylic resins such as "JON-CRYL 7100", "JONCRYL 734" and "JONCRYL 538" (all available from BASF Japan, Ltd.); polyester resins such as "POLYESTER WR901" and "POLYESTER WR960" both available from The Nippon Synthetic Chemical Industry Co., Ltd.; urethane resins such as "WBR-2018" and "WBR-2000U" (both available from Taisei Fine Chemical Co., Ltd.); styrene-butadiene resins such as "SR-100" and "SR-102" (both available from Nippon A & L Inc.); and vinyl chloride-based resins such as "VINYBLAN 701" and "VINYBLAN 711" (both available from Nissin Chemical Industry Co., Ltd.).

Of these resins, particularly preferred are acrylic resins, polyester resins, urethane resins and vinyl chloride resins. These resins may be used in combination of any two or more thereof.

The mass ratio of the water-insoluble polymer particles B to the pigment [pigment/water-insoluble polymer particles B] is preferably not less than 100/300, more preferably not less than 100/200 and even more preferably not less than 100/150, and is also preferably not more than 100/25, more preferably not more than 100/50 and even more preferably not more than 100/70 from the viewpoint of promoting drying of printed images or characters and improving the rub fastness and optical density of the printed images or characters when printed on a low-water absorbing recording medium.

The content of the water-insoluble polymer particles B in the water-based ink for ink-jet printing used in the present invention is preferably not less than 1.0% by mass, more preferably not less than 2.0% by mass and even more preferably not less than 3.0% by mass from the viewpoint of improving the rub fastness of printed images or characters when printed on a low-water absorbing recording medium, and is also preferably not more than 10% by mass, more preferably not more than 8.0% by mass and even more preferably not more than 6.0% by mass, from the viewpoints of reducing the viscosity of the ink upon evaporating the solvent therefrom, and increasing the dot size of the ink and enhancing the optical density of the ink when printed on a low-water absorbing recording medium, as well as from the viewpoint of improving the storage stability and ejection property of the water-based ink.

[Organic Solvent C]

The water-based ink for ink-jet printing as used in the present invention contains the organic solvent C in an amount of not less than 20% by mass from the viewpoint of enhancing the ejection property of the water-based ink. The organic solvent C contains one or more organic solvents having a boiling point of 90° C. or higher, and the weighted mean boiling point of the organic solvent C which is weighted by contents (% by mass) of the respective organic solvents in the organic solvent C is 250° C. or lower. If two or more organic solvents are used as the organic solvent C, a plurality of organic solvents that have different boiling points from each other are preferably used.

The weighted mean boiling point of the organic solvent C is preferably not lower than 150° C. and more preferably not lower than 180° C. from the viewpoint of preventing dry-out of the ink in ink-jet nozzles, and is also preferably not higher than 240° C., more preferably not higher than 230° C. and even more preferably not higher than 220° C. from the viewpoint of promoting drying of printed images or characters and improving the rub fastness of the printed images or characters when printed on a low-water absorbing recording medium.

As the boiling point of an organic solvent is lowered, the saturated vapor pressure and the evaporation rate of the organic solvent as measured at a specific temperature are increased. In addition, as the content of the organic solvent having a high evaporation rate as measured at the specific temperature in the mixed organic solvent is increased, the evaporation rate of the mixed organic solvent as measured at the specific temperature is enhanced. Therefore, the weighted mean boiling point of the organic solvent C is regarded as an index of the evaporation rate of the mixed organic solvent.

Meanwhile, the weighted mean boiling point of the organic solvent C having, for example, the composition A as shown in Example 1 which has a glycerol content of 10.0% by mass and a propylene glycol content of 30.3% by mass is 213° C. as the value calculated from the following formula.

[glycerol content (% by mass)×boiling point of glycerol (290° C.)]+[propylene glycol content (% by mass)×boiling point of propylene glycol (188° C.)]/[glycerol content (% by mass)+propylene glycol content (% by mass)]=[[0.10×290° C.]+[0.303×188° C.]]/[0.10+0.303]=213° C.

Examples of the compound used as the organic solvent C include polyhydric alcohols, polyhydric alcohol alkyl ethers, nitrogen-containing heterocyclic compounds, amides, amines and sulfur-containing compounds. Among these compounds, from the viewpoint of improving the storage stability and ejection property of the water-based ink, preferred is one or two compounds selected from the group consisting of polyhydric alcohols and polyhydric alcohol alkyl ethers, and more preferred are polyhydric alcohols. The polyhydric alcohols may be in the form of a mixed alcohol containing a plurality of compounds belonging to the concept of polyhydric alcohols, and the polyhydric alcohol alkyl ethers may also be in the form of a mixed ether containing a plurality of compounds belonging to the concept of polyhydric alcohol alkyl ethers.

The content of the one or two compounds selected from the group consisting of polyhydric alcohols and polyhydric alcohol alkyl ethers in the organic solvent C is preferably not less than 80% by mass, more preferably not less than 90% by mass, even more preferably not less than 95% by mass, further even more preferably substantially 100% by mass, and most preferably 100% by mass.

Examples of the polyhydric alcohols include ethylene glycol (b.p. 197° C.), diethylene glycol (b.p. 244° C.), polyethylene glycol, propylene glycol (b.p. 188° C.), dipropylene glycol (b.p. 232° C.), polypropylene glycol, 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 1,6-hexanediol (b.p. 250° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.). Triethylene glycol (b.p. 285° C.), tripropylene glycol (b.p. 273° C.) and glycerol (b.p. 290° C.), etc., may also be used in combination with a compound having a boiling point lower than 250° C. Among these polyhydric alcohols, from the viewpoint of attaining excellent spreading of the dot size and improving the optical density and rub fastness of the ink when printed on a low-water absorbing recording medium, preferred are glycerol, propylene glycol and diethylene glycol.

Examples of the polyhydric alcohol alkyl ethers include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monobutyl ether (b.p. 230° C.), triethylene glycol monomethyl ether (b.p. 122° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monobutyl ether (b.p. 227° C.), dipropylene glycol monomethyl ether (b.p. 90° C.), tripropylene glycol monomethyl ether (b.p. 100° C.) and tripropylene glycol monobutyl ether. Triethylene glycol monobutyl ether (b.p. 276° C.) or the like may also be used in combination with a compound having a boiling point lower than 250° C. Among these polyhydric alcohol alkyl ethers, from the viewpoint of attaining excellent spreading of the dot size and improving the optical density and rub fastness of the ink when printed on a low-water absorbing recording medium, preferred is dipropylene glycol monomethyl ether.

Examples of the nitrogen-containing heterocyclic compounds include N-methyl-2-pyrrolidone (b.p. 202° C.), 2-pyrrolidone (b.p. 245° C.), 1,3-dimethyl imidazolidinone (b.p. 220° C.) and ε-caprolactam (b.p. 136° C.).

Examples of the amides include formamide (b.p. 210° C.), N-methyl formamide (b.p. 199° C.) and N,N-dimethyl formamide (b.p. 153° C.).

Examples of the amines include monoethanolamine (b.p. 170° C.), diethanolamine (b.p. 217° C.), triethanolamine (b.p. 208° C.) and triethylamine (b.p. 90° C.).

Examples of the sulfur-containing compounds include dimethyl sulfoxide (b.p. 189° C.), sulfolane (b.p. 285° C.), etc. Thiodiglycol (b.p. 282° C.) and the like may be used in combination with a compound having a boiling point lower than 250° C.

Among these compounds, from the viewpoint of attaining excellent spreading of the dot size and improving the optical density and rub fastness of the ink when printed on a low-water absorbing recording medium as well as from the viewpoint of enhancing the ejection property of the ink, preferred are the combination of two or more kinds of polyhydric alcohols, the combination of two or more kinds of polyhydric alcohol alkyl ethers and the combination of at least one polyhydric alcohol and at least one polyhydric alcohol alkyl ether; more preferred are the combination of two or more kinds of polyhydric alcohols or the combination of at least one polyhydric alcohol and at least one polyhydric alcohol alkyl ether; and even more preferred is the combination of at least one compound selected from the group consisting of propylene glycol, diethylene glycol and dipropylene glycol monomethyl ether, and glycerol.

The mass ratio of the organic solvent (X) as the at least one compound selected from the group consisting of propylene glycol, diethylene glycol and dipropylene glycol monomethyl ether to glycerol [organic solvent (X)/glycerol] is preferably not less than 0.5, more preferably not less than 1.0 and even more preferably not less than 2.0 from the viewpoint of promoting drying of printed images or characters and improving the rub fastness of the printed images or characters when printed on a low-water absorbing recording medium, and is also preferably not more than 20, more preferably not more than 17 and even more preferably not more than 13 from the viewpoint of enhancing the ejection property of the ink.

The content of the organic solvent C in the water-based ink is preferably not less than 20% by mass, more preferably not less than 30% by mass and even more preferably not less than 35% by mass from the viewpoint of enhancing the ejection property of the ink, and is also preferably not more than 60% by mass, more preferably not more than 50% by mass and even more preferably not more than 45% by mass from the viewpoint of enhancing the storage stability of the water-based ink, as well as from the viewpoint of promoting drying of printed images or characters and improving the rub fastness of the printed images or characters when printed on a low-water absorbing recording medium.

The total content of propylene glycol, diethylene glycol, dipropylene glycol monomethyl ether and glycerol in the water-based ink is preferably not less than 20% by mass, more preferably not less than 30% by mass and even more preferably not less than 35% by mass from the viewpoint of enhancing the ejection property of the ink, and is also preferably not more than 60% by mass, more preferably not more than 50% by mass and even more preferably not more than 45% by mass from the viewpoint of enhancing the storage stability of the water-based ink, as well as from the viewpoint of promoting drying of printed images or characters and improving the rub fastness of the printed images or characters when printed on a low-water absorbing recording medium.

The total content of propylene glycol, diethylene glycol, dipropylene glycol monomethyl ether and glycerol in the organic solvent C is preferably not less than 80% by mass, more preferably not less than 90% by mass, even more preferably not less than 95% by mass and further even more preferably substantially 100% by mass from the viewpoint of enhancing the ejection property of the ink, as well as from the viewpoint of promoting drying of printed images or characters and improving the rub fastness of the printed images or characters when printed on a low-water absorbing recording medium.

The total content of propylene glycol and diethylene glycol in the water-based ink is preferably not less than 15% by mass, more preferably not less than 20% by mass and even more preferably not less than 25% by mass from the viewpoint of attaining excellent spreading of the dot size and improving the optical density and rub fastness of the ink when printed on a low-water absorbing recording medium, and is also preferably not more than 55% by mass, more preferably not more than 45% by mass and even more preferably not more than 40% by mass from the same viewpoints as described above.

The content of dipropylene glycol monomethyl ether in the water-based ink is preferably not less than 1% by mass, more preferably not less than 1.5% by mass and even more preferably not less than 2% by mass from the viewpoint of attaining excellent spreading of the dot size and improving the optical density and rub fastness of the ink when printed on a low-water absorbing recording medium, and is also preferably not more than 30% by mass, more preferably not more than 10% by mass and even more preferably not more than 5% by mass from the same viewpoints as described above.

The content of glycerol in the water-based ink is preferably not less than 1% by mass, more preferably not less than 3% by mass and even more preferably not less than 5% by mass from the viewpoint of enhancing the ejection property of the ink, and is also preferably not more than 20% by mass, more preferably not more than 15% by mass and even more preferably not more than 10% by mass from the viewpoint of attaining excellent spreading of the dot size and improving the optical density and rub fastness of the ink when printed on a low-water absorbing recording medium.

[Water]

The content of water in the water-based ink for ink-jet printing is preferably not less than 20% by mass, more preferably not less than 30% by mass and even more preferably not less than 40% by mass, from the viewpoints of enhancing the optical density of the ink when printed on a high-water absorbing recording medium, and improving spreading of the dot size of the ink and enhancing the optical density and rub fastness of the ink when printed on a low-water absorbing recording medium, as well as from the viewpoint of improving the storage stability of the water-based ink, and is also preferably not more than 70% by mass, more preferably not more than 65% by mass and even more preferably not more than 60% by mass, from the viewpoint of enhancing the ejection property of the ink.

[Other Components]

The water-based ink for ink-jet printing according to the present invention may also contain various ordinary additives such as a wetting agent, a penetrant, a dispersant, a surfactant, a viscosity controller, a defoaming agent, an antiseptic agent, a mildew-proof agent and a rust preventive.

[Process for Producing Water-Based Ink for Ink-Jet Printing]

The water-based ink for ink-jet printing may be produced by mixing a water dispersion of the pigment-containing water-insoluble polymer particles A, the water-insoluble polymer particles B, water and the organic solvent C, if required, together with a surfactant, etc., with each other while stirring. Upon the mixing, the water-insoluble polymer particles A and the water-insoluble polymer particles B are preferably added and mixed in this order from the viewpoint of suppressing aggregation of these particles.

[Properties of Ink]

The viscosity of the water-based ink for ink-jet printing as measured at 32° C. is preferably not less than 2.0 mPa·s, more preferably not less than 3.0 mPa·s and even more preferably not less than 5.0 mPa·s from the viewpoint of enhancing the ejection property of the water-based ink, and is also preferably not more than 12 mPa·s, more preferably not more than 9.0 mPa·s and even more preferably not more than 7.0 mPa·s from the viewpoint of enhancing the storage stability and ejection property of the water-based ink.

Meanwhile, the viscosity of the water-based ink at 32° C. may be measured by the method described in Examples below.

The pH value of the water-based ink for ink-jet printing is preferably not less than 7.0, more preferably not less than 8.0 and even more preferably not less than 8.5 from the viewpoint of enhancing the storage stability and ejection property of the water-based ink as well as from the viewpoint of attaining excellent spreading of the dot size and improving the optical density and rub fastness of the ink when printed on a low-water absorbing recording medium, and is also preferably not more than 11.0, more preferably not more than 10.0 and even more preferably not more than 9.5 from the viewpoint of improving the resistance of members to the ink and suppressing skin irritation. Meanwhile, the pH value of the water-based ink may be measured by the method described in Examples below.

<Ink-Jet Printing Method>

The water-based ink for ink-jet printing according to the present invention is allowed to fly onto an ink-jet recording medium using a conventionally known ink-jet printer to thereby record images or characters thereon.

The ink-jet printer may be of a thermal type or piezoelectric type. The water-based ink for ink-jet printing according to the present invention is preferably used as a water-based ink for a piezoelectric type ink-jet printer.

[Image Forming Method]

The image forming method of the present invention is a method in which the aforementioned water-based ink for ink-jet printing is ejected onto an ink-jet recording medium to form images thereon, and includes step A of forming images on a recording medium having a water absorption of not less than 10 g/m$^2$ as measured under the condition that a contact time between the recording medium and the ink is 100 ms; and step B of forming images on a recording medium having a water absorption of not less than 0 g/m$^2$ and less than 10 g/m$^2$ as measured under the condition that a contact time between the recording medium and the ink is 100 ms, in which the water-based ink used in the step A has the same composition as that of the water-based ink used in the step B. The term "same composition" as used herein means that kinds of components in the ink as well as contents of the components in the ink are the same.

Also, the image forming method of the present invention is a method in which the aforementioned water-based ink for ink-jet printing is ejected onto an ink-jet recording medium using an ink-jet printer to form images thereon, and the ink-jet printer is equipped with a feeder for supplying a recording medium having a water absorption of not less than 10 g/m$^2$ as measured under the condition that a contact time between the recording medium and the ink is 100 ms, and a feeder for supplying a recording medium having a water absorption of not less than 0 g/m$^2$ and less than 10 g/m$^2$ as measured under the condition that a contact time between the recording medium and the ink is 100 ms.

Further, the image forming method of the present invention is a method in which the aforementioned water-based ink for ink-jet printing is ejected onto an ink-jet recording medium to form images thereon, and the difference between an optical density of a solid image printed on a recording medium having a water absorption of not less than 10 g/m$^2$ as measured under the condition that a contact time between the recording medium and the ink is 100 ms, and an optical density of a solid image printed on a recording medium having a water absorption of not less than 0 g/m$^2$ and less than 10 g/m$^2$ as measured under the condition that a contact time between the recording medium and the ink is 100 ms is preferably not more than 1.0, more preferably not more than 0.90, even more preferably not more than 0.80, and further even more preferably not more than 0.70, as an absolute value thereof, when the solid images are formed using the same ink-jet printer and the water-based ink having the same composition. The term "solid image" as used herein means an image having an ink ejection amount of 100% as measured under the condition that the amount of ink droplets ejected is 5 pL and the resolution is 3600×1200 dpi.

As the absolute value of the difference between the optical density values becomes smaller, the change between the high-water absorbing recording medium and the low-water absorbing recording medium, as well as the control of the printing conditions after the change between the high-water absorbing recording medium and the low-water absorbing recording medium can be more facilitated. As a result, such an ink can be suitably used for the image forming method including the step A of forming images on the high-water absorbing recording medium and the step B of forming images on the low-water absorbing recording medium, in which the water-based ink used in the step A has the same composition as that of the water-based ink used in the step B, and the image forming method using the ink-jet printer equipped with the feeder for supplying the high-water absorbing recording medium and the feeder for supplying the low-water absorbing recording medium.

<Recording Medium for Ink-Jet Printing>

The water absorption of a recording medium for ink-jet printing as used in the present invention is not particularly limited. The water absorption of the high-water absorbing recording medium as measured under the condition that a contact time between the recording medium and pure water is 100 ms is usually not less than 10 g/m$^2$. Whereas, the water absorption of the low-water absorbing recording medium as measured under the condition that a contact time between the recording medium and pure water is 100 ms is usually not less than 0 g/m$^2$ and less than 10 g/m$^2$.

Meanwhile, the water absorption of the recording medium for ink-jet printing as measured under the condition that a contact time between the recording medium and pure water is 100 ms may be measured by the method described in Examples below.

The recording medium for ink-jet printing used in the present invention may be a high-water absorbing plain paper, a low-water absorbing coated paper or a film.

Examples of the plain paper include "4200" (available from Fuji Xerox Co., Ltd.; water absorption as measured in a contact time of 100 ms: 14.0 g/m$^2$), etc.

Examples of the coated paper include a general-purpose glossy paper "OK Topcoat+" (available from Oji Paper Co., Ltd.; basis weight: 104.7 g/m$^2$; water absorption as measured in a contact time of 100 ms (hereinafter defined in the same way): 4.9 g/m$^2$), a multi-color foam glossy paper (available from Oji Paper Co., Ltd.; basis weight: 104.7 g/m$^2$; water absorption: 5.2 g/m$^2$), "UPM Finesse Gloss" (available from UPM; basis weight: 115 g/m$^2$; water absorption: 3.1 g/m$^2$), "UPM Finesse Matt" (available from UPM; basis weight: 115 g/m$^2$; water absorption: 4.4 g/m$^2$), "TerraPress Silk" (available from Stora Enso; basis weight: 80 g/m²; water absorption: 4.1 g/m²), and "LumiArt" (available from Stora Enso; basis weight: 90 g/m²), etc.

Examples of the film include a polyester film, a vinyl chloride film, a polypropylene film, a polyethylene film and a nylon film. These films may be subjected to surface treatments such as corona treatment, etc., if required.

Examples of the generally available films include "LUMIRROR T60" (available from Toray Industries, Inc.; polyethylene terephthalate; thickness: 125 μm; water absorption: 2.3 g/m²), "PVC80B P" (available from Lintec Corp.; polyvinyl chloride; water absorption: 1.4 g/m²), "KINATH KEE 70CA" (available from Lintec Corp.; polyethylene), "YUPO SG90 PAT1" (available from Lintec Corp.; polypropylene), and "BONYL RX" (available from KOHJIN Film & Chemical Co., Ltd.; nylon).

With respect to the aforementioned embodiments, the present invention further provides the following aspects relating to the ink-jet printing methods, etc.

<1> A water-based ink for ink-jet printing, including pigment-containing water-insoluble polymer particles A, water-insoluble polymer particles B, an organic solvent C and water, the water-insoluble polymer particles A being constituted of a water-insoluble polymer (a) including a constitutional unit derived from an ionic monomer (a-1), a constitutional unit derived from an aromatic ring-containing hydrophobic monomer (a-2) and a constitutional unit derived from a hydrophilic nonionic monomer (a-3) represented by the above formula (1), the constitutional unit derived from the hydrophilic nonionic monomer (a-3) being present in an amount of not less than 13% by mass and not more than 45% by mass on the basis of whole constitutional units in the water-insoluble polymer (a);

the organic solvent C including one or more organic solvents having a boiling point of 90° C. or higher, in which a weighted mean boiling point of the organic solvent C which is weighted by contents (% by mass) of the respective organic solvents in the organic solvent C is 250° C. or lower; and a content of the organic solvent C in the water-based ink being not less than 20% by mass.

<2> The water-based ink for ink-jet printing according to the aspect <1>, wherein in the formula (1), m is preferably not less than 3 and is also preferably not more than 5, and more preferably 4.

<3> The water-based ink for ink-jet printing according to the aspect <1> or <2>, wherein in the formula (1), $R^1$ is preferably a methyl group.

<4> The water-based ink for ink-jet printing according to any one of the aspects <1> to <3>, wherein in the formula (1), $R^2$ is preferably a hydrogen atom or an alkyl group having not less than 1 an not more than 20 carbon atoms, more preferably an alkyl group having not less than 1 and not more than 3 carbon atoms, and even more preferably a methyl group.

<5> The water-based ink for ink-jet printing according to any one of the aspects <1> to <4>, wherein the monomer (a-3) is preferably at least one compound selected from the group consisting of polyethylene glycol mono(meth)acrylate, methoxy polyethylene glycol mono(meth)acrylate, octoxy polyethylene glycol mono(meth)acrylate and stearoxypolyethylene glycol mono(meth)acrylate, and more preferably methoxy polyethylene glycol mono(meth)acrylate.

<6> The water-based ink for ink-jet printing according to any one of the aspects <1> to <5>, wherein the monomer (a-1) is preferably a carboxylic acid monomer, more preferably acrylic acid or methacrylic acid, and even more preferably methacrylic acid.

<7> The water-based ink for ink-jet printing according to any one of the aspects <1> to <6>, wherein the monomer (a-2) is preferably at least one monomer selected from the group consisting of a styrene-based monomer, an aromatic group-containing (meth)acrylate and a styrene-based macromonomer, more preferably at least one or two monomers selected from the group consisting of an aromatic group-containing (meth)acrylate and a styrene-based macromonomer, even more preferably combination of an aromatic group-containing (meth)acrylate and a styrene-based macromonomer, and further even more preferably combination of benzyl(meth)acrylate and a styrene-based macromonomer.

<8> The water-based ink for ink-jet printing according to any one of the aspects <1> to <7>, wherein upon production of the water-insoluble polymer (a), a content of the monomer (a-3) in a monomer mixture containing the monomers (a-1), (a-2) and (a-3) or a content of a constitutional unit derived from the monomer (a-3) in the water-insoluble polymer (a) is preferably not less than 15% by mass and more preferably not less than 18% by mass, and is also preferably not more than 40% by mass and more preferably not more than 38% by mass, as well as is preferably from 15 to 40% by mass and more preferably from 18 to 38% by mass.

<9> The water-based ink for ink-jet printing according to any one of the aspects <1> to <8>, wherein upon production of the water-insoluble polymer (a), a content of the monomer (a-1) in a monomer mixture containing the monomers (a-1), (a-2) and (a-3) or a content of a constitutional unit derived from the monomer (a-1) in the water-insoluble polymer (a) is preferably not less than 3% by mass, more preferably not less than 5% by mass and even more preferably not less than 8% by mass, and is also preferably not more than 40% by mass, more preferably not more than 25% by mass and even more preferably not more than 20% by mass.

<10> The water-based ink for ink-jet printing according to any one of the aspects <1> to <9>, wherein upon production of the water-insoluble polymer (a), a content of the monomer (a-2) in a monomer mixture containing the monomers (a-1), (a-2) and (a-3) or a content of a constitutional unit derived from the monomer (a-2) in the water-insoluble polymer (a) is preferably not less than 20% by mass, more preferably not less than 40% by mass and even more preferably not less than 50% by mass, and is also preferably not more than 80% by mass, more preferably not more than 75% by mass and even more preferably not more than 70% by mass.

<11> The water-based ink for ink-jet printing according to any one of the aspects <1> to <10>, wherein upon production of the water-insoluble polymer (a), a content of the styrene-based macromer in a monomer mixture containing the monomers (a-1), (a-2) and (a-3) or a content of a constitutional unit derived from the styrene-based macromer in the water-insoluble polymer (a) is preferably not less than 5% by mass, more preferably not less than 8% by mass, and even more preferably not less than 10% by mass, and is also preferably not more than 25% by mass, more preferably not more than 20% by mass, even more preferably not more than 15% by mass, and further even more preferably not more than 12% by mass.

<12> The water-based ink for ink-jet printing according to any one of the aspects <1> to <11>, wherein a mass ratio of the component (a-1) to a sum of the component (a-2) and the component (a-3) [component (a-1)/[component (a-2)+component (a-3)]] is preferably not less than 0.03, more preferably not less than 0.05 and even more preferably not less than 0.10, and is also preferably not more than 0.50, more preferably not more than 0.30 and even more preferably not more than 0.20.

<13> The water-based ink for ink-jet printing according to any one of the aspects <1> to <12>, wherein the weighted mean boiling point of the organic solvent C is preferably not lower than 150° C. and more preferably not lower than 180° C., and is also preferably not higher than 240° C., more preferably not higher than 230° C. and even more preferably not higher than 220° C.

<14> The water-based ink for ink-jet printing according to any one of the aspects <1> to <13>, wherein the organic solvent C is preferably at least one compound selected from the group consisting of a polyhydric alcohol and a polyhydric alcohol alkyl ether, more preferably combination of two or more kinds of polyhydric alcohols, combination of two or more kinds of polyhydric alcohol alkyl ethers or combination of at least one polyhydric alcohol and at least one polyhydric alcohol alkyl ether, even more preferably combination of two or more kinds of polyhydric alcohols or combination of at least one polyhydric alcohol and at least one polyhydric alcohol alkyl ether, and further even more preferably combination of at least one compound selected from the group consisting of propylene glycol, diethylene glycol and dipropylene glycol monomethyl ether, and glycerol.

<15> The water-based ink for ink-jet printing according to any one of the aspects <1> to <14>, wherein a content of the one or two compounds selected from the group consisting of a polyhydric alcohol and a polyhydric alcohol alkyl ether in the organic solvent C is preferably not less than 80% by mass, more preferably not less than 90% by mass, even more preferably not less than 95% by mass, further even more preferably substantially 100% by mass, and most preferably 100% by mass.

<16> The water-based ink for ink-jet printing according to any one of the aspects <1> to <15>, wherein a mass ratio of at least one organic solvent (X) selected from the group consisting of propylene glycol, diethylene glycol and dipropylene glycol monomethyl ether to glycerol [organic solvent (X)/glycerol] is preferably not less than 0.5, more preferably not less than 1.0 and even more preferably not less than 2.0, and is also preferably not more than 20, more preferably not more than 17 and even more preferably not more than 13.

<17> The ink-jet printing method according to any one of the aspects <1> to <16>, wherein a content of the pigment-containing water-insoluble polymer particles A in the water-based ink is preferably not less than 1% by mass, more preferably not less than 3% by mass and even more preferably not less than 4% by mass, and is also preferably not more than 20% by mass, more preferably not more than 10% by mass and even more preferably not more than 8% by mass.

<18> The water-based ink for ink-jet printing according to any one of the aspects <1> to <17>, wherein a content of the pigment in the water-based ink is preferably not less than 1% by mass, more preferably not less than 2% by mass and even more preferably not less than 3% by mass, and is also preferably not more than 15% by mass, more preferably not more than 10% by mass and even more preferably not more than 6% by mass.

<19> The water-based ink for ink-jet printing according to any one of the aspects <1> to <18>, wherein a content of the water-insoluble polymer (a) in the water-based ink is preferably not less than 0.5% by mass, more preferably not less than 0.8% by mass and even more preferably not less than 1% by mass, and is also preferably not more than 6% by mass, more preferably not more than 3% by mass and even more preferably not more than 2% by mass.

<20> The water-based ink for ink-jet printing according to any one of the aspects <1> to <19>, wherein a mass ratio of the pigment to the water-insoluble polymer (a) [pigment/water-insoluble polymer (a)] is preferably from 30/70 to 90/10, more preferably from 50/50 to 85/15, and even more preferably from 70/30 to 80/20.

<21> The water-based ink for ink-jet printing according to any one of the aspects <1> to <20>, wherein a content of the water-insoluble polymer particles B in the water-based ink is preferably not less than 1.0% by mass, more preferably not less than 2.0% by mass and even more preferably not less than 3.0% by mass, and is also preferably not more than 10% by mass, more preferably not more than 8.0% by mass and even more preferably not more than 6.0% by mass.

<22> The water-based ink for ink-jet printing according to any one of the aspects <1> to <21>, wherein a mass ratio of the water-insoluble polymer particles B to the pigment [pigment/water-insoluble polymer particles B] is preferably from 100/25 to 100/300, more preferably from 100/50 to 100/200 and even more preferably from 100/70 to 100/150.

<23> The water-based ink for ink-jet printing according to any one of the aspects <1> to <22>, wherein a content of the organic solvent C in the water-based ink is preferably not less than 20% by mass, more preferably not less than 30% by mass and even more preferably not less than 35% by mass, and is also preferably not more than 60% by mass, more preferably not more than 50% by mass and even more preferably not more than 45% by mass.

<24> The water-based ink for ink-jet printing according to any one of the aspects <1> to <23>, wherein a content of glycerol in the water-based ink is preferably not less than 1% by mass, more preferably not less than 3% by mass and even more preferably not less than 5% by mass, and is also preferably not more than 20% by mass, more preferably not more than 15% by mass and even more preferably not more than 10% by mass.

<25> The water-based ink for ink-jet printing according to any one of the aspects <1> to <24>, wherein a total content of propylene glycol and diethylene glycol in the water-based ink is preferably not less than 15% by mass, more preferably not less than 20% by mass and even more preferably not less than 25% by mass, and is also preferably not more than 55% by mass, more preferably not more than 45% by mass and even more preferably not more than 40% by mass.

<26> The water-based ink for ink-jet printing according to any one of the aspects <1> to <25>, wherein a total content of propylene glycol, diethylene glycol, dipropylene glycol monomethyl ether and glycerol in the water-based ink is preferably not less than 30% by mass and more preferably not less than 35% by mass, and is also preferably not more than 60% by mass, more preferably not more than 50% by mass and even more preferably not more than 45% by mass.

<27> The water-based ink for ink-jet printing according to any one of the aspects <1> to <26>, wherein the pigment-containing water-insoluble polymer particles A are compounded in the form of a pigment water dispersion in the water-based ink for ink-jet printing.

<28> The water-based ink for ink-jet printing according to any one of the aspects <1> to <27>, wherein the pigment water dispersion of the pigment-containing water-insoluble polymer particles A is produced by the following steps (1) and (2):

Step (1): subjecting a mixture of the water-insoluble polymer (a), an organic solvent (b), a pigment and water to dispersion treatment to obtain a dispersion treatment product; and Step (2): removing the organic solvent (b) from the dispersion treatment product obtained in the step (1) to obtain the pigment water dispersion.

<29> The ink-jet printing method according to any one of the aspects <1> to <28>, wherein a weight-average molecular weight of the water-insoluble polymer (a) is preferably not less than 10,000, more preferably not less than 15,000 and even more preferably not less than 20,000, and is also preferably not more than 150,000, more preferably not more than 100,000 and even more preferably not more than 60,000.

<30> The water-based ink for ink-jet printing according to any one of the aspects <1> to <29>, wherein an average particle size of the pigment-containing water-insoluble polymer particles A in the pigment water dispersion or the water-based ink is preferably not less than 40 nm, more preferably not less than 60 nm and even more preferably not less than 75 nm, and is also preferably not more than 150 nm, more preferably not more than 120 nm, even more preferably not more than 110 nm and further even more preferably not more than 100 nm.

<31> The water-based ink for ink-jet printing according to any one of the aspects <1> to <30>, wherein an average particle size of the water-insoluble polymer particles B in the dispersion containing the water-insoluble polymer particles B or the water-based ink is preferably not less than 10 nm, more preferably not less than 30 nm and even more preferably not less than 50 nm, and is also preferably not more than 300 nm, more preferably not more than 150 nm and even more preferably not more than 100 nm.

<32> The water-based ink for ink-jet printing according to any one of the aspects <1> to <31>, wherein the water-based ink for ink-jet printing is used for piezoelectric-type ink-jet printing.

<33> The water-based ink for ink-jet printing according to any one of the aspects <1> to <32>, wherein the water-insoluble polymer (a) constituting the water-insoluble polymer particles A is in the form of a crosslinked water-insoluble polymer.

<34> The water-based ink for ink-jet printing according to any one of the aspects <1> to <33>, wherein the pigment water dispersion is mixed with a crosslinking agent and subjected to crosslinking treatment, and the resulting crosslinked pigment water dispersion is compounded in the water-based ink for ink-jet printing.

<35> The water-based ink for ink-jet printing according to the aspect <34>, wherein the crosslinking agent is a compound containing a functional group that is capable of reacting with an anionic group of the water-insoluble polymer (a) constituting the water-insoluble polymer particles A, and a compound containing the 2 or more functional groups and preferably the 2 to 6 functional groups in a molecule thereof.

<36> The water-based ink for ink-jet printing according to the aspect <34> or <35>, wherein the crosslinking agent is preferably at least one compound selected from the group consisting of a compound containing two or more epoxy groups in a molecule thereof, a compound containing two or more oxazoline groups in a molecule thereof, and a compound containing two or more isocyanate groups in a molecule thereof, more preferably a compound containing two or more epoxy groups in a molecule thereof, and even more preferably a compound containing 2 or 3 epoxy groups in a molecule thereof.

<37> The water-based ink for ink-jet printing according to the aspect <36>, wherein the compound containing two or more epoxy groups in a molecule thereof is preferably a glycidyl ether of a polyhydric alcohol, and more preferably trimethylol propane polyglycidyl ether.

<38> The water-based ink for ink-jet printing according to any one of the aspects <34> to <37>, wherein the crosslinking agent is used in such an amount that a mass ratio of the crosslinking agent to the water-insoluble polymer (a) [crosslinking agent/water-insoluble polymer (a)] is preferably from 1/100 to 30/100, more preferably from 3/100 to 25/100, and even more preferably from 5/100 to 20/100.

<39> The water-based ink for ink-jet printing according to any one of the aspects <34> to <37>, wherein the crosslinking agent is used in such an amount as to react with preferably from 1 to 80 mmol, more preferably from 5 to 60 mmol and even more preferably from 10 to 50 mmol of an anionic group of the water-insoluble polymer (a) in terms of an amount of the anionic group per 1 g of the water-insoluble polymer (a).

<40> The water-based ink for ink-jet printing according to any one of the aspects <33> to <39>, wherein a crosslinking rate of the crosslinked water-insoluble polymer is preferably from 1 to 80 mol %, more preferably from 5 to 60 mol %, and even more preferably from 10 to 50 mol %.

<41> An image forming method in which the water-based ink for ink-jet printing according to any one of the aspects <1> to <40> is ejected onto an ink-jet recording medium to form images thereon, said method including:

Step A of forming images on a recording medium having a water absorption of not less than 10 $g/m^2$ as measured under the condition that a contact time between the recording medium and the ink is 100 ms; and Step B of forming images on a recording medium having a water absorption of not less than 0 $g/m^2$ and less than 10 $g/m^2$ as measured under the condition that a contact time between the recording medium and the ink is 100 ms, in which the water-based ink used in the step A has the same composition as that of the water-based ink used in the step B.

<42> An image forming method in which the water-based ink for ink-jet printing according to any one of the aspects <1> to <40> is ejected onto an ink-jet recording medium using an ink-jet printer to form images thereon, the ink-jet printer being equipped with a feeder for supplying a recording medium having a water absorption of not less than 10 $g/m^2$ as measured under the condition that a contact time between the recording medium and the ink is 100 ms, and a feeder for supplying a recording medium having a water absorption of not less than 0 $g/m^2$ and less than 10 $g/m^2$ as measured under the condition that a contact time between the recording medium and the ink is 100 ms.

<43> An image forming method in which the water-based ink for ink-jet printing according to any one of the aspects <1> to <40> is ejected onto an ink-jet recording medium to form images thereon, a difference between an optical density of a solid image printed on a recording medium having a water absorption of not less than 10 $g/m^2$ as measured under the condition that a contact time between the recording medium and the ink is 100 ms, and an optical density of a solid image printed on a recording medium having a water absorption of not less than 0 $g/m^2$ and less than 10 $g/m^2$ as measured under the condition that a contact time between the recording medium and the ink is 100 ms being preferably not more than 1.0, more preferably not more than 0.90, even more preferably not more than 0.80, and further even more preferably not more than 0.70, as an absolute value thereof, when the solid images are formed using the same ink-jet printer and the water-based ink having the same composition.

<44> A use of the water-based ink for ink-jet printing according to any one of the aspects <1> to <40> for ink-jet printing.

EXAMPLES

In the following Production Examples, Examples and Comparative Examples, the "part(s)" and "%" indicate "part(s) by mass" and "% by mass", respectively, unless otherwise specified.

(1) Measurement of Weight-Average Molecular Weight of Polymer

The weight-average molecular weight of the polymer was measured by gel chromatographic method [GPC apparatus: "HLC-8120GPC" available from Tosoh Corp.; column: "TSK-GEL α-M"×2 available from Tosoh Corp.; flow rate: 1 mL/min)] using N,N-dimethyl formamide in which phosphoric acid and lithium bromide were dissolved in amounts of 60 mmol/L and 50 mmol/L, respectively, as an eluent, and using a polystyrene as a reference standard substance.

(2) Measurement of Average Particle Sizes of Pigment-Containing Water-Insoluble Polymer Particles A and Water-Insoluble Polymer Particles B The particles were subjected to cumulant analysis using a laser particle analyzing system "ELS-8000" (available from Otsuka Electronics Co., Ltd.) to measure an average particle size thereof. The measurement was conducted at a temperature of 25° C., an angle between incident light and detector of 90° and a cumulative frequency of 100, and a refractive index of water (1.333) was input to the analyzing system as a refractive index of the dispersing medium. Further, the measurement was conducted by adjusting the concentration of the dispersion to be measured to $5 \times 10^{-3}$% by mass in terms of the solid content thereof.

Meanwhile, the average particle sizes of an anionic self-crosslinked aqueous acrylic resin "Neocryl A1127", a polyester resin emulsion "POLYESTER WR960", a urethane resin emulsion "WBR-2018" and a vinyl chloride resin emulsion "VINYBLAN 711" used as the water-insoluble polymer particles B in Examples were 63.2 nm, 65 nm, 59 nm and 70 nm, respectively.

(3) Measurement of Solid Content of Pigment Water Dispersion

Ten grams (10.0 g) of sodium sulfate dried to constant weight in a desiccator were weighed and charged in a 30 mL polypropylene vessel (φ: 40 mm; height: 30 mm), and about 1.0 g of a sample was added to the vessel. The contents of the vessel were mixed and then accurately weighed. The resulting mixture was held in the vessel at 105° C. for 2 h to remove volatile components therefrom and further allowed to stand in a desiccator for 15 min to measure a mass thereof. The mass of the sample after removing the volatile components therefrom was regarded as a mass of solids therein. The solid content of the sample was calculated by dividing the mass of the solids by the mass of the sample added.

(4) pH of Ink

The pH value of the ink at 25° C. was measured using a bench-top pH meter "F-71" available from Horiba Ltd., equipped with a pH electrode "6337-10D" available from Horiba Ltd.

(5) Viscosity of Ink

The viscosity of the ink was measured at 32° C. using an E-type viscometer "TV-25" (equipped with a standard cone rotor (1° 34'×R24); rotating speed: 50 rpm) available from Toki Sangyo Co., Ltd.

(6) Water Absorption of Recording Medium as Measured in Pure Water Contact Time of 100 ms Using an automatic scanning liquid absorptometer "KM500win" available from Kumagai Riki Kogyo Co., Ltd., the amount of pure water transferred to a recording medium when contacted with pure water for 100 ms was measured at 23° C. and a relative humidity of 50%. The thus measured amount of pure water transferred to the recording medium was determined as a water absorption of the recording medium as measured in a pure water contact time of 100 ms. The measuring conditions are as follows.

"Spiral Method"
  Contact time: 0.010~1.0 (sec)
  Pitch (mm): 7
  Length Per Sampling (degree): 86.29
  Start Radius (mm): 20
  End Radius (mm): 60
  Min Contact Time (ms): 10
  Max Contact Time (ms): 1000
  Sampling Pattern (1-50): 50
  Number of Sampling Points (>0): 19
"Square Head"
  Split Span (mm): 1
  Split Width (mm): 5

The values of water absorption of a general-purpose glossy paper "OK Topcoat+" (available from Oji Paper Co., Ltd.) and a plain paper "4200" (available from Fuji Xerox Co., Ltd.) were 4.9 g/m$^2$ and 14.0 g/m$^2$, respectively.

Production Examples I-1 to I-6

Production of Water-Insoluble Polymer Solutions 1 to 6

The monomers, solvent, polymerization initiator and chain transfer agent as shown in each column "Initially Charged Monomer Solution" in Table 1 were charged into a reaction vessel equipped with two dropping funnels 1 and 2 and mixed with each other, and the inside atmosphere of the reaction vessel was replaced with a nitrogen gas, thereby obtaining an initially charged monomer solution.

On the other hand, the monomers, solvent, polymerization initiator and chain transfer agent as shown in each column "Dropping Monomer Solution 1" in Table 1 were mixed with each other to obtain a dropping monomer solution 1. The resulting dropping monomer solution 1 was charged into the dropping funnel 1, and the inside atmosphere of the dropping funnel 1 was replaced with a nitrogen gas.

In addition, the monomers, solvent, polymerization initiator and chain transfer agent as shown in each column "Dropping Monomer Solution 2" in Table 1 were mixed with each other to obtain a dropping monomer solution 2. The resulting dropping monomer solution 2 was charged into the dropping funnel 2, and the inside atmosphere of the dropping funnel 2 was replaced with a nitrogen gas.

In a nitrogen atmosphere, the initially charged monomer solution in the reaction vessel was held at 77° C. while stirring, and the dropping monomer solution 1 in the dropping funnel 1 was gradually added dropwise to the reaction vessel over 3 h. Next, the dropping monomer solution 2 in the dropping funnel 2 was gradually added dropwise to the reaction vessel over 2 h. After completion of the dropwise addition, the mixed solution in the reaction vessel was stirred at 77° C. for 0.5 h. Then, a polymerization initiator solution prepared by dissolving 1.1 parts of the above polymerization initiator 2,2'-azobis(2,4-dimethylvaleronitrile) ("V-65" (tradename) available from Wako Pure Chemical Industries, Ltd.) in 47.3 parts of methyl ethyl ketone was added to the mixed solution, and the resulting reaction solution was aged at 77° C. for 0.5 h while stirring. The above procedure including the preparation and addition of the polymerization initiator solution and the aging of the reaction solution was repeated five more times. Then, after maintaining the reaction solution in the reaction vessel at 80° C. for 1 h, about 200 parts of methyl ethyl ketone were added thereto to adjust the solid content of the reaction solution to 45.2%, thereby obtaining a polymer solution.

The compositions and weight-average molecular weights of the thus obtained water-insoluble polymers (a1) to (a6) are shown in Table 2.

Meanwhile, the details of the monomers used herein were as follows.

Methacrylic acid: Available from Wako Pure Chemical Industries, Ltd.

Benzyl methacrylate: Available from Wako Pure Chemical Industries, Ltd.

Styrene: Available from Wako Pure Chemical Industries, Ltd.

Styrene-based macromonomer: "AS-6(S)" (available from Toagosei Co., Ltd.; concentration of active ingredients: 50% by mass; number-average molecular weight: 6000)

Methoxy polyethylene glycol monomethacrylate (m=4): "NK ESTER TM-40G" available from Shin-Nakamura Chemical Co., Ltd.

Methoxy polyethylene glycol monomethacrylate (m=9): "NK ESTER TM-90G" available from Shin-Nakamura Chemical Co., Ltd.

Methoxy polyethylene glycol monomethacrylate (m=23): "NK ESTER TM-230G" available from Shin-Nakamura Chemical Co., Ltd.

Pentapropylene glycol monomethacrylate: "PP-1000" available from NOF Corp.

TABLE 1

| | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) |
|---|---|---|---|---|---|---|---|---|---|
| | Polymer solution 1 | | | Polymer solution 2 | | | Polymer solution 3 | | |
| Ionic monomer (a-1) | | | | | | | | | |
| Methacrylic acid | | 72.8 | 18.2 | | 72.8 | 18.2 | | 72.8 | 18.2 |
| Hydrophobic monomer (a-2) | | | | | | | | | |
| Benzyl methacrylate | 39.9 | 319.2 | 39.9 | 29.4 | 235.2 | 29.4 | 46.9 | 375.2 | 46.9 |
| Styrene | | | | | | | | | |
| Styrene-based macromonomer (AS-6S) | 14.0 | 126.0 | | 14.0 | 126.0 | | 14.0 | 126.0 | |
| Hydrophilic monomer (a-3) | | | | | | | | | |
| MPEGMA*1 (m = 4) | 14.0 | 112.0 | 14.0 | 24.5 | 196.0 | 24.5 | 7.0 | 56.0 | 7.0 |
| Other monomers | | | | | | | | | |
| MPEGMA*1 (m = 9) | | | | | | | | | |
| MPEGMA*1 (m = 23) | | | | | | | | | |
| PPGMA*2 | | | | | | | | | |
| Solvent | | | | | | | | | |
| Methyl ethyl ketone | 15.8 | 173.3 | 126.0 | 15.8 | 173.2 | 126.0 | 15.8 | 173.3 | 126.0 |
| Polymerization initiator | | | | | | | | | |
| V-65 | | 5.6 | 1.4 | | 5.6 | 1.4 | | 5.6 | 1.4 |
| Chain transfer agent | | | | | | | | | |
| 2-Mercaptoethanol | 0.4 | 2.4 | 0.7 | 0.4 | 2.4 | 0.7 | 0.4 | 2.4 | 0.7 |
| Water-insoluble polymer produced | Water-insoluble polymer (a1) | | | Water-insoluble polymer (a2) | | | Water-insoluble polymer (a3) | | |
| | Polymer solution 4 | | | Polymer solution 5 | | | Polymer solution 6 | | |
| Ionic monomer (a-1) | | | | | | | | | |
| Methacrylic acid | | 72.8 | 18.2 | | 72.8 | 18.2 | | 78.4 | 19.6 |
| Hydrophobic monomer (a-2) | | | | | | | | | |
| Benzyl methacrylate | 39.9 | 319.2 | 39.9 | 39.9 | 319.2 | 39.9 | | | |
| Styrene | | | | | | | 32.2 | 257.6 | 32.2 |
| Styrene-based macromonomer (AS-6S) | 14.0 | 126.0 | | 14.0 | 126.0 | | 21.0 | 189.0 | |
| Hydrophilic monomer (a-3) | | | | | | | | | |
| MPEGMA*1 (m = 4) | | | | | | | | | |

TABLE 1-continued

| | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) |
|---|---|---|---|---|---|---|---|---|---|
| Other monomers | | | | | | | | | |
| MPEGMA*[1] (m = 9) | 14.0 | 112.0 | 14.0 | | | | | | |
| MPEGMA*[1] (m = 23) | | | | 14.0 | 112.0 | 14.0 | | | |
| PPGMA*[2] | | | | | | | 17.5 | 140.0 | 17.5 |
| Solvent | | | | | | | | | |
| Methyl ethyl ketone | 15.8 | 173.3 | 126.0 | 15.8 | 173.3 | 126.0 | 15.8 | 173.3 | 126.0 |
| Polymerization initiator | | | | | | | | | |
| V-65 | | 5.6 | 1.4 | | 5.6 | 1.4 | | 5.6 | 1.4 |
| Chain transfer agent | | | | | | | | | |
| 2-Mercaptoethanol | 0.4 | 2.4 | 0.7 | 0.4 | 2.4 | 0.7 | 0.4 | 2.4 | 0.7 |
| Water-insoluble polymer produced | Water-insoluble polymer (a4) | | | Water-insoluble polymer (a5) | | | Water-insoluble polymer (a6) | | |

Note
*[1]MPEGMA: Methoxy polyethylene glycol monomethacrylate
*[2]PPGMA: Pentapropylene glycol monomethacrylate

TABLE 2

| | Composition (%) and molecular weight of water-insoluble polymer (a) produced | | | | | |
|---|---|---|---|---|---|---|
| | a1 | a2 | a3 | a4 | a5 | a6 |
| Ionic monomer (a-1) | | | | | | |
| Methacrylic acid | 13 | 13 | 13 | 13 | 13 | 14 |
| Hydrophobic monomer (a-2) | | | | | | |
| Benzyl methacrylate | 57 | 42 | 67 | 57 | 57 | |
| Styrene | | | | | | 46 |
| Styrene-based macromonomer | 10 | 10 | 10 | 10 | 10 | 15 |
| Hydrophilic monomer (a-3) | | | | | | |
| MPEGMA (m = 4)*[1] | 20 | 35 | 10 | | | |
| Other monomers | | | | | | |
| MPEGMA (m = 9)*[1] | | | | 20 | | |
| MPEGMA (m = 23)*[1] | | | | | 20 | |
| PPGMA*[2] | | | | | | 25 |
| Weight-average molecular weight | 33449 | 33732 | 33511 | 25112 | 28258 | 27306 |

Note
*[1]MPEGMA: Methoxy polyethylene glycol monomethacrylate
*[2]PPGMA: Pentapropylene glycol monomethacrylate Production Example II-1

Production of Pigment Water Dispersion 1

The water-insoluble polymer 1 solution (solid content: 45.2%) obtained in Production Example 1 and methyl ethyl ketone (MEK) were mixed with each other in amounts of 44.2 parts and 36.1 parts, respectively, thereby obtaining an MEK solution of the water-insoluble polymer (a1). The resulting water-insoluble polymer MEK solution was charged into a 2 L-capacity disper, and while stirring the solution at 1400 rpm, 176.8 parts of ion-exchanged water, 6.1 parts of a 5N sodium hydroxide aqueous solution and 1.3 parts of a 25% ammonia aqueous solution were added thereto such that the degree of neutralization of the water-insoluble polymer by sodium hydroxide was adjusted to 85% and the degree of neutralization of the water-insoluble polymer by ammonia was adjusted to 40%. The resulting reaction solution was stirred at 1400 rpm for 15 min while cooling the solution in a water bath at 0° C. Then, 60 parts of carbon black "MONARCH800" available from Cabot Corp., as a pigment were added to the reaction solution, and the resulting mixture was stirred at 7000 rpm for 3 h. The obtained pigment mixture was subjected to dispersion treatment under a pressure of 150 MPa by passing through a disperser "MICROFLUIDIZER M-110EH-30XP" (available from Microfluidics Corp.) 20 times, thereby obtaining a dispersion treatment product. The resulting dispersion treatment product had a solid content of 25.0%.

A 2 L egg-plant shaped flask was charged with 324.5 parts of the dispersion treatment product obtained in the above step, and then 216.3 parts of ion-exchanged water were added thereto (solid content: 15.0%), and the resulting mixture was held under a pressure of 0.09 MPa in a warm water bath adjusted at 32° C. for 3 h using a rotary distillation apparatus "Rotary Evaporator N-1000S" available from Tokyo Rikakikai Co., Ltd., operated at a rotating speed of 50 rpm to remove the organic solvent therefrom. Further, the temperature of the warm water bath was adjusted to 62° C., and the pressure was reduced to 0.07 MPa, and the reaction solution was concentrated under this condition until reaching a solid content of 25%.

The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 min. Thereafter, the resulting liquid layer portion was filtered through a 5 µm membrane filter "Minisart" available from Sartorius Inc.

Added to 300 parts of the resulting filtrate (pigment: 55.1 parts; water-insoluble polymer (a1): 18.4 parts) were 48.4 parts of ion-exchanged water. Further, 18.4 parts of glycerol and 0.74 part of "Proxel LVS" (Arch Chemicals Japan, Inc.; 1,2-benzoisothiazol-3(2H)-one; active ingredient content: 20%; mildew-proof agent) were added thereto, followed by stirring the resulting mixture at 70° C. or 1 h. The obtained mixture was cooled to 25° C. and then filtered through the above 5 µm filter, and further ion-exchanged water was added to the resulting product to control a solid content thereof to 20.0%, thereby obtaining a pigment water dispersion 1.

The average particle size of the pigment-containing water-insoluble polymer particles A1 contained in the resulting pigment water dispersion 1 is shown in Table 3.

Production Examples II-2 to II-6

Production of Pigment Water Dispersions 2 to 6

The same procedure as in Production Example II-1 was repeated except that the water-insoluble polymer (a1) was replaced with the respective water-insoluble polymers (a2) to (a6), thereby obtaining pigment water dispersions 2 to 6. The results are shown in Table 3.

Production Example II-7

Production of Pigment Water Dispersion 7

The same procedure as in Production Example II-1 was repeated except that the pigment was replaced with a yellow pigment "FAST YELLOW 7414" (C.I. Pigment Yellow 74) available from Sanyo Color Works, Ltd., and the rotating speed used in the centrifugal separation step was changed from 7000 rpm to 3660 rpm, thereby obtaining a pigment water dispersion 7. The results are shown in Table 3.

Production Example II-8

Production of Pigment Water Dispersion 8

The same procedure as in Production Example II-1 was repeated except that the pigment was replaced with a magenta pigment "CHROMOFINE RED 6111T" (C.I. Pigment Red 122) available from Dainichiseika Color & Chemicals Mfg. Co., Ltd., thereby obtaining a pigment water dispersion 8. The results are shown in Table 3.

Production Example II-9

Production of Pigment Water Dispersion 9

The same procedure as in Production Example II-1 was repeated except that the pigment was replaced with a cyan pigment "CHROMOFINE BLUE 6338JC" available from Dainichiseika Color & Chemicals Mfg. Co., Ltd., and the rotating speed used in the centrifugal separation step was changed from 7000 rpm to 3660 rpm, thereby obtaining a pigment water dispersion 9. The results are shown in Table 3.

Production Example II-10

Production of Pigment Water Dispersion 10

The same procedure as in Production Example II-1 was repeated except that the amount of the 5N sodium hydroxide aqueous solution used and the degree of neutralization by sodium hydroxide were changed to 3.6 parts and 50%, respectively; 53.1 parts of ion-exchanged water were added to 300 parts of the filtrate (pigment: 55.1 parts; water-insoluble polymer: 18.4 parts), and further 18.4 parts of glycerol, 0.74 part of "Proxel LVS" and 1.98 parts of an epoxy crosslinking agent "EX-321" (trimethylol propane polyglycidyl ether; epoxy equivalent: 140) available from Nagase ChemteX Corporation were added thereto, followed by stirring the resulting mixed solution at 70° C. for 5 h to crosslink 50% of methacrylic acid as an unneutralized component with the above epoxy compound; the obtained mixture was cooled to 25° C. and then filtered through the above 5 µm filter; and further ion-exchanged water was added to the resulting product to control a solid content thereof to 20.55%, thereby obtaining a pigment water dispersion 10. The results are shown in Table 3.

TABLE 3

| Kind of pigment dispersion | Kind of water-insoluble polymer (a) | Mass ratio (pigment/polymer) | Average particle size (nm) | Solid content (% by mass) |
| --- | --- | --- | --- | --- |
| Pigment dispersion 1 | Water-insoluble polymer (a1) | 75/25 | 82 | 20.0 |
| Pigment dispersion 2 | Water-insoluble polymer (a2) | 75/25 | 81 | 20.0 |
| Pigment dispersion 3 | Water-insoluble polymer (a3) | 75/25 | 85 | 20.0 |
| Pigment dispersion 4 | Water-insoluble polymer (a4) | 75/25 | 87 | 20.0 |
| Pigment dispersion 5 | Water-insoluble polymer (a5) | 75/25 | 85 | 20.0 |
| Pigment dispersion 6 | Water-insoluble polymer (a6) | 75/25 | 81 | 20.0 |
| Pigment dispersion 7 | Water-insoluble polymer (a1) | 75/25 | 122 | 20.0 |
| Pigment dispersion 8 | Water-insoluble polymer (a1) | 75/25 | 111 | 20.0 |
| Pigment dispersion 9 | Water-insoluble polymer (a1) | 75/25 | 92 | 20.0 |
| Pigment dispersion 10 | Water-insoluble polymer (a1) | 73/27 | 84 | 20.55 |

Example 1

Production of Ink 1

The pigment water dispersion 1 was used to prepare a water-based ink 1 for ink-jet printing. Specifically, the water-based ink 1 was prepared from the following composition A formulated such that the resulting ink contained the pigment and the water-insoluble polymer particles B in amounts of 4% by mass and 5% by mass, respectively, and had a pH value of 9.0.

<Composition A>

| | |
|---|---|
| Pigment water dispersion 1 (containing 5% of glycerol) | 26.67 parts |
| Water-insoluble polymer particles B: anionic self-crosslinked aqueous acrylic resin "Neocryl A1127" (available from DSM NeoResins, Inc.; solid content: 44% by mass; average particle size: 63.2 nm) | 11.36 parts |
| Glycerol (available from Wako Pure Chemical Industries, Ltd.) | 8.67 parts |
| Propylene glycol (available from Wako Pure Chemical Industries, Ltd.) | 30 parts |
| "SURFYNOL 104PG-50" (available from Nissin Chemical Industry Co., Ltd.; a propylene glycol solution of an acetylene glycol-based surfactant; active ingredient content: 50%) | 0.60 part |
| "EMULGEN 120" (available from Kao Corp.; polyoxyethylene lauryl ether) | 0.60 part |
| 1N Sodium hydroxide aqueous solution | 1.42 parts |
| Ion-exchanged water | 20.68 parts |

The resulting mixed solution was filtered through the above 5 μm filter, thereby obtaining the ink 1. Properties of the ink 1 are shown in Table 4.

Meanwhile, the boiling point of the organic solvent C as a weighted mean value thereof which is weighted by contents (% by mass) of the respective organic solvents therein was 213° C. as the value calculated from the following formula.

[[glycerol content (% by mass)×boiling point of glycerol (290° C.)]+[propylene glycol content (% by mass)×boiling point of propylene glycol (188° C.)]]/[glycerol content (% by mass)+propylene glycol content (% by mass)]=[[0.1×290° C.]+[0.303×188° C.]]/[0.1+0.303]=213° C.

Example 2 and Comparative Examples 1 to 4

Production of Inks 2 to 6

The same procedure as in Example 1 was repeated except that the pigment water dispersion 1 was replaced with the respective pigment water dispersions 2 to 6, thereby obtaining inks 2 to 6. However, the amounts of the 1N sodium hydroxide aqueous solution and ion-exchanged water compounded in the dispersion was adequately adjusted such that the total amount thereof was 22.1 parts, and the pH value of the ink prepared after compounding these components was 9.0. Properties of the thus obtained inks 2 to 6 are shown in Table 4.

Comparative Example 5

Production of Ink 7

The pigment water dispersion 1 was used to prepare a water-based ink 7 for ink-jet printing. Specifically, the water-based ink 7 was prepared from the following composition B formulated such that the resulting ink contained the pigment and the water-insoluble polymer particles B in amounts of 4% by mass and 5% by mass, respectively, and had a pH value of 9.0.

<Composition B>

| | |
|---|---|
| Pigment water dispersion 1 (containing 5% of glycerol) | 26.67 parts |
| Water-insoluble polymer particles B: anionic self-crosslinked aqueous acrylic resin "Neocryl A1127" (available from DSM NeoResins, Inc.; solid content: 44% by weight) | 11.36 parts |
| Glycerol (available from Wako Pure Chemical Industries, Ltd.) | 27.67 parts |
| Propylene glycol (available from Wako Pure Chemical Industries, Ltd.) | 10 parts |
| "SURFYNOL 104PG-50" (available from Nissin Chemical Industry Co., Ltd.; a propylene glycol solution of an acetylene glycol-based surfactant; active ingredient content: 50%) | 0.60 part |
| "EMULGEN 120" (available from Kao Corp.; polyoxyethylene lauryl ether) | 0.60 part |
| 1N Sodium hydroxide aqueous solution | 1.36 parts |
| Ion-exchanged water | 21.74 parts |

The resulting mixed solution was filtered through the above 5 μm filter, thereby obtaining the ink 7. Properties of the ink 7 are shown in Table 4.

Meanwhile, the boiling point of the mixed organic solvent as a weighted mean value thereof which is weighted by contents (% by mass) of the respective organic solvents therein was 263° C.

Example 3

Production of Ink 8

The pigment water dispersion 1 was used to prepare a water-based ink 8 for ink-jet printing. Specifically, the ink 8 was prepared from the following composition C formulated such that the resulting ink contained the pigment and the water-insoluble polymer particles B in amounts of 4% by mass and 5% by mass, respectively, and had a pH value of 9.0.

<Composition C>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| 1,2-Butanediol (available from Wako Pure Chemical Industries, Ltd.) | 36.0 parts |
| "SURFYNOL 104PG-50" (available from Nissin Chemical Industry Co., Ltd.) | 0.6 part |
| "EMULGEN 120" (available from Kao Corp.) | 0.60 part |
| 1N Sodium hydroxide aqueous solution | 1.36 parts |
| Ion-exchanged water | 23.38 parts |

The resulting mixed solution was filtered through the above 5 μm filter, thereby obtaining the ink 8. Properties of the ink 8 are shown in Table 4. Meanwhile, the boiling point of the organic solvent as a weighted mean value thereof which is weighted by content (% by mass) of the organic solvent was 194° C.

Example 4

Production of Ink 9

The pigment water dispersion 1 was used to prepare a water-based ink 9 for ink-jet printing. Specifically, the ink 9 was prepared from the following composition D formulated such that the resulting ink contained the pigment and the water-insoluble polymer particles B in amounts of 4% by mass and 5% by mass, respectively, and had a pH value of 9.0.

<Composition D>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| 1,3-Propanediol (available from Wako Pure Chemical Industries, Ltd.) | 40.0 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 19.38 parts |

The resulting mixed solution was filtered through the above 5 μm filter, thereby obtaining the ink 9. Properties of the ink 9 are shown in Table 4. Meanwhile, the boiling point of the organic solvent as a weighted mean value thereof which is weighted by content (% by mass) of the organic solvent was 216° C.

Example 5

Production of Ink 10

The pigment water dispersion 1 was used to prepare a water-based ink 10 for ink-jet printing. Specifically, the ink 10 was prepared from the following composition E formulated such that the resulting ink contained the pigment and the water-insoluble polymer particles B in amounts of 4% by mass and 5% by mass, respectively, and had a pH value of 9.0.

<Composition E>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| Diethylene glycol (available from Wako Pure Chemical Industries, Ltd.) | 38.0 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 21.38 parts |

The resulting mixed solution was filtered through the above 5 μm filter, thereby obtaining the ink 10. Properties of the ink 10 are shown in Table 4. Meanwhile, the boiling point of the organic solvent as a weighted mean value thereof which is weighted by content (% by mass) of the organic solvent was 245° C.

Example 6

Production of Ink 11

The pigment water dispersion 1 was used to prepare a water-based ink 11 for ink-jet printing. Specifically, the ink 11 was prepared from the following composition F formulated such that the resulting ink contained the pigment and the water-insoluble polymer particles B in amounts of 4% by mass and 5% by mass, respectively, and had a pH value of 9.0.

<Composition F>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| Propylene glycol (available from Wako Pure Chemical Industries, Ltd.) | 25.0 parts |
| Dipropylene glycol monomethyl ether (available from Wako Pure Chemical Industries, Ltd.) | 10.0 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 24.38 parts |

The resulting mixed solution was filtered through the above 5 μm filter, thereby obtaining the ink 11. Properties of the ink 11 are shown in Table 4. Meanwhile, the boiling point of the mixed organic solvent as a weighted mean value thereof which is weighted by contents (% by mass) of the respective organic solvents therein was 192° C.

Example 7

Production of Ink 12

The pigment water dispersion 1 was used to prepare a water-based ink 12 for ink-jet printing. Specifically, the ink 12 was prepared from the following composition G formulated such that the resulting ink contained the pigment and the water-insoluble polymer particles B in amounts of 4% by mass and 5% by mass, respectively, and had a pH value of 9.0.

<Composition G>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| Propylene glycol (available from Wako Pure Chemical Industries, Ltd.) | 25.0 parts |
| Diethylene glycol monoisobutyl ether (available from Wako Pure Chemical Industries, Ltd.) | 10.0 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 24.38 parts |

The resulting mixed solution was filtered through the above 5 μm filter, thereby obtaining the ink 12. Properties of the ink 12 are shown in Table 4. Meanwhile, the boiling point of the mixed organic solvent as a weighted mean value thereof which is weighted by contents (% by mass) of the respective organic solvents therein was 200° C.

Example 8

Production of Ink 13

The pigment water dispersion 1 was used to prepare a water-based ink 13 for ink-jet printing. Specifically, the ink 13 was prepared from the following composition H formulated such that the resulting ink contained the pigment and the water-insoluble polymer particles B in amounts of 4% by mass and 5% by mass, respectively, and had a pH value of 9.0.

<Composition H>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| Propylene glycol (available from Wako Pure Chemical Industries, Ltd.) | 25.0 parts |
| Triethylene glycol monomethyl ether (available from Wako Pure Chemical Industries, Ltd.) | 10.0 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 24.38 parts |

The resulting mixed solution was filtered through the above 5 μm filter, thereby obtaining the ink 13. Properties of the ink 13 are shown in Table 4. Meanwhile, the boiling point of the mixed organic solvent as a weighted mean value thereof which is weighted by contents (% by mass) of the respective organic solvents therein was 208° C.

Example 9

Production of Ink 14

The same procedure as in Example 1 using the pigment water dispersion 1 was repeated except that the water-insoluble polymer particles B (as a dispersion of the aqueous acrylic resin "Neocryl A1127") used in the ink 1 were replaced with 12.5 parts of a polyester resin emulsion "POLYESTER WR960" (available from The Nippon Synthetic Chemical Industry Co., Ltd.; Tg: 40° C.; solid content: 40% by weight), and the amount of ion-exchanged water used therein was changed to 19.54 parts, thereby obtaining an ink 14. Properties of the ink 14 are shown in Table 4.

Example 10

Production of Ink 15

The same procedure as in Example 1 using the pigment water dispersion 1 was repeated except that the water-insoluble polymer particles B (as a dispersion of the aqueous acrylic resin "Neocryl A1127") used in the ink 1 were replaced with 15.38 parts of a urethane resin emulsion "WBR-2018" (available from Taisei Fine Chemical Co., Ltd.; Tg: 20° C.; solid content: 32.5% by weight), and the amount of ion-exchanged water used therein was changed to 16.66 parts, thereby obtaining an ink 15 for ink-jet printing. Properties of the ink 15 are shown in Table 4.

Example 11

Production of Ink 16

The same procedure as in Example 1 using the pigment water dispersion 1 was repeated except that the water-insoluble polymer particles B (as a dispersion of the aqueous acrylic resin "Neocryl A1127") used in the ink 2 were replaced with 12.5 parts of a vinyl chloride resin emulsion "VINYBLAN 711" (available from Nissin Chemical Industry Co., Ltd.; Tg: 20° C.; solid content: 40% by weight), and the amount of ion-exchanged water used therein was changed to 19.54 parts, thereby obtaining an ink 16 for ink-jet printing. Properties of the ink 16 are shown in Table 4.

Examples 12 to 15

Production of Inks 17 to 20

The same procedure as in Example 1 was repeated except that the pigment water dispersion 1 was replaced with the respective pigment water dispersions 7 to 10, thereby obtaining inks 17 to 20. Properties of the thus obtained inks 17 to 20 are shown in Table 4.

Comparative Example 6

Production of Ink 21

The same procedure as in Example 1 was repeated except that 11.36 parts of the water-insoluble polymer particles B (as a dispersion of the aqueous acrylic resin "Neocryl A1127") were not used and instead replaced with the same amount of ion-exchanged water, thereby obtaining an ink 21. Properties of the thus obtained ink 21 are shown in Table 4.

Comparative Example 7

Production of Ink 22

The pigment water dispersion 1 was used to prepare a water-based ink 22 for ink-jet printing. Specifically, the ink 22 was prepared from the following composition I formulated such that the resulting ink contained the pigment and the water-insoluble polymer particles B in amounts of 4% by mass and 5% by mass, respectively, and had a pH value of 9.0.

<Composition I>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| Glycerol (available from Kao Corporation) | 3.67 parts |
| 2-Pyrrolidone (available from Wako Pure Chemical Industries, Ltd.) | 5.0 parts |
| Isopropyl alcohol (available from Wako Pure Chemical Industries, Ltd.) | 2.0 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 48.71 parts |

The resulting mixed solution was filtered through the above 5 μm filter, thereby obtaining an ink 22. Properties of the ink 22 are shown in Table 4. Meanwhile, the boiling point of the mixed organic solvent as a weighted mean value thereof which is weighted by contents (% by mass) of the respective organic solvents therein was 235° C.

Comparative Example 8

Production of Ink 23

The pigment water dispersion 1 was used to prepare a water-based ink 23 for ink-jet printing. Specifically, the ink 23 was prepared from the following composition J formulated such that the resulting ink contained the pigment and the water-insoluble polymer particles B in amounts of 4% by mass and 5% by mass, respectively, and had a pH value of 9.0.

<Composition J>

| | |
|---|---|
| Pigment water dispersion 1 | 26.7 parts |
| Water-insoluble polymer particles B: anionic self-crosslinked aqueous acrylic resin "Neocryl A1127" (available from DSM NeoResins, Inc.; solid content: 44% by weight) | 11.36 parts |
| Diethylene glycol (available from Wako Pure Chemical Industries, Ltd.) | 15.0 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 44.38 parts |

The resulting mixed solution was filtered through the above 5 μm filter, thereby obtaining an ink 23. Properties of the ink 23 are shown in Table 4. Meanwhile, the boiling point of the organic solvent as a weighted mean value thereof which is weighted by content (% by mass) of the organic solvent was 247° C.

<Evaluation for Spreading of Dot Size, Rub Fastness and Optical Density of Ink>

The above obtained inks 1 to 23 were subjected to the following Experimental Example 1 to evaluate spreading of the dot size, and further the printed matters 1 to 3 obtained in the following Preparation Examples 1 and 2 were evaluated for optical density and rub fastness thereof by the following measuring methods. The results are shown in Table 5.

Experimental Example 1

Evaluation of Spreading of Dot Size

As the dot size when printed on a low-water absorbing recording medium increases, the ink is more excellent in effect of preventing formation of white spots in printed images or characters upon one-pass printing. The dot size has a correlation with a viscosity of the ink when concentrated.

TABLE 4

| | Ink | pH | Viscosity (mPa·s) | Kind of water-insoluble polymer (a) | Pigment water dispersion | Weighed mean value of boiling point of organic solvent C | Content of organic solvent C in water-based ink |
|---|---|---|---|---|---|---|---|
| Example 1 | Ink 1 | 9.0 | 6.2 | Water-insoluble polymer (a1) | Pigment water dispersion 1 | 213° C. | 40.30% |
| Example 2 | Ink 2 | 9.0 | 6.4 | Water-insoluble polymer (a2) | Pigment water dispersion 2 | 213° C. | 40.30% |
| Example 3 | Ink 8 | 9.0 | 5.5 | Water-insoluble polymer (a1) | Pigment water dispersion 1 | 194° C. | 37.63% |
| Example 4 | Ink 9 | 9.0 | 6.5 | Water-insoluble polymer (a1) | Pigment water dispersion 1 | 216° C. | 41.63% |
| Example 5 | Ink 10 | 9.0 | 6.9 | Water-insoluble polymer (a1) | Pigment water dispersion 1 | 245° C. | 39.63% |
| Example 6 | Ink 11 | 9.0 | 5.7 | Water-insoluble polymer (a1) | Pigment water dispersion 1 | 192° C. | 36.63% |
| Example 7 | Ink 12 | 9.0 | 6.2 | Water-insoluble polymer (a1) | Pigment water dispersion 1 | 200° C. | 36.63% |
| Example 8 | Ink 13 | 9.0 | 6.8 | Water-insoluble polymer (a1) | Pigment water dispersion 1 | 208° C. | 36.63% |
| Example 9 | Ink 14 | 9.0 | 6.3 | Water-insoluble polymer (a1) | Pigment water dispersion 1 | 213° C. | 40.30% |
| Example 10 | Ink 15 | 9.0 | 6.2 | Water-insoluble polymer (a1) | Pigment water dispersion 1 | 213° C. | 40.30% |
| Example 11 | Ink 16 | 9.0 | 6.5 | Water-insoluble polymer (a1) | Pigment water dispersion 1 | 213° C. | 40.30% |
| Example 12 | Ink 17 | 9.0 | 5.9 | Water-insoluble polymer (a1) | Pigment water dispersion 7 | 213° C. | 40.30% |
| Example 13 | Ink 18 | 9.0 | 6.5 | Water-insoluble polymer (a1) | Pigment water dispersion 8 | 213° C. | 40.30% |
| Example 14 | Ink 19 | 9.0 | 5.7 | Water-insoluble polymer (a1) | Pigment water dispersion 9 | 213° C. | 40.30% |
| Example 15 | Ink 20 | 9.0 | 6.3 | Water-insoluble polymer (a1) | Pigment water dispersion 10 | 213° C. | 40.30% |
| Comparative Example 1 | Ink 3 | 9.0 | 6.1 | Water-insoluble polymer (a3) | Pigment water dispersion 3 | 213° C. | 40.30% |
| Comparative Example 2 | Ink 4 | 9.0 | 6.2 | Water-insoluble polymer (a4) | Pigment water dispersion 4 | 213° C. | 40.30% |
| Comparative Example 3 | Ink 5 | 9.0 | 6.6 | Water-insoluble polymer (a5) | Pigment water dispersion 5 | 213° C. | 40.30% |
| Comparative Example 4 | Ink 6 | 9.0 | 6.8 | Water-insoluble polymer (a6) | Pigment water dispersion 6 | 213° C. | 40.30% |
| Comparative Example 5 | Ink 7 | 9.0 | 6.0 | Water-insoluble polymer (a1) | Pigment water dispersion 1 | 263° C. | 39.30% |
| Comparative Example 6 | Ink 21 | 9.0 | 4.2 | Water-insoluble polymer (a1) | Pigment water dispersion 1 | 213° C. | 40.30% |
| Comparative Example 7 | Ink 22 | 9.0 | 3.0 | Water-insoluble polymer (a1) | Pigment water dispersion 1 | 235° C. | 12.30% |
| Comparative Example 8 | Ink 23 | 9.0 | 3.3 | Water-insoluble polymer (a1) | Pigment water dispersion 1 | 247° C. | 16.63% |

The dot size was evaluated by the viscosity of the ink when concentrated. As the viscosity of the ink is reduced, the ink is more excellent in spreading of the dot size as well as ejection property.

(1) Preparation of Concentrated Ink

Using a reduced pressure dryer, the inks obtained in Examples 1 to 15 and Comparative Examples 1 to 8 were respectively concentrated at 60° C. under a pressure of 210 mmHg, thereby preparing inks having a degree of concentration of 60%. Meanwhile, the degree of concentration of the respective inks was calculated from the following formula.

Degree of concentration=(mass of ink after being concentrated/mass of initial ink)×100

(2) Viscosity of Respective Concentrated Inks

Using a rheometer "MCR301" (available from Anton Paar GmbH; using a cone plate "CP50-1"), the above respective concentrated inks were subjected to measurement of a stress at 32° C. at an increased shear rate of each of 100, 200, 300, 400, 500, 600, 700, 800, 900 and 1000. The thus obtained stress-shear rate plots were fit by a least squares method so as to allow a straight line of the characteristic curve to pass through an origin, and a gradient of the straight line was defined as a viscosity of the concentrated ink.

Preparation Example 1

Preparation of Printed Matters 1 and 2 (Low-Water Absorbing Recording Media: Glossy Papers)

(Preparation of Printed Matters)

The commercially available ink-jet printer "GX-2500" (available from Ricoh Company, Ltd.; piezoelectric-type) was loaded with the respective water-based inks 1 to 23 obtained in Examples 1 to 15 and Comparative Examples 1 to 8, and the A4 solid image (monochrome) printing was carried out on a general-purpose glossy paper "OK Topcoat+" (available from Oji Paper Co., Ltd.; basis weight: 104.7 g/m$^2$; water absorption: 4.9 g/m$^2$) at 23° C. and 50% RH under the printing condition of "gloss coated paper; Kirei; no color matching" with an ink ejection amount of 100% (amount of ink droplets ejected: 5 pL; resolution: 3600×1200 dpi), thereby obtaining the following printed matters 1 and 2.

Printed Matter 1: Printed matter obtained by conducting the above solid image printing on the general-purpose glossy paper and then allowing the thus printed paper to stand at 23° C. and 50% RH for 24 h for drying the solid image.

Printed Matter 2: Printed matter obtained by conducting the above solid image printing on the general-purpose glossy paper and then heating the thus printed paper for 15 s on an analogue hot plate "(NINOS) NA-2" (available from AS ONE Corp.) heated to 100° C. for drying the solid image.

Preparation Example 2

Preparation of Printed Matter 3 (High-Water Absorbing Recording Medium: Plain Paper)

The same ink-jet printer as used in Preparation Example 1 was loaded with the respective water-based inks 1 to 23 obtained in Examples 1 to 15 and Comparative Examples 1 to 8, respectively, and the A4 solid image (monochrome) printing was carried out on a plain paper "4200" (available from Fuji Xerox Co., Ltd.; water absorption: 14.0 g/m$^2$) at 23° C. and 50% RH under the printing condition of "plain paper; Fast; no color matching" with an ink ejection amount of 100% (amount of ink droplets ejected: 5 pL; resolution: 3600×1200 dpi), thereby obtaining the following printed matter 3.

Printed Matter 3: Printed matter obtained by conducting the above solid image printing on the plain paper and then allowing the thus printed paper to stand at 23° C. and 50% RH for 24 h for drying the solid image.

(Measurement of Optical Density)

The optical density values of the respective solid image portions on the printed matters 1 and 3 were measured using an optical densitometer "SpectroEye" (available from Gretag Macbeth GmbH) in a measuring mode of (DIN, Abs). As the measured value increases, the ink is more excellent in optical density.

Also, the absolute value of the difference in optical density between the solid image portions of the printed matters 1 and 3 was evaluated as the optical density difference. As the absolute value of the optical density difference becomes smaller, the change in type of the recording medium as well as the change in printing conditions after the change in type of the recording medium are more facilitated.

(Measurement of Rub Fastness)

The printed matter 2 immediately after being dried was subjected to a rub fastness test in which each printed matter was rubbed with a cotton "BEMCOT M-3" (available from Asahi Kasei Corp.) as a friction material using a Sutherland-type Ink Rub Tester "AB-201" (available from Tester Sangyo Co., Ltd.) under a load of 2000 g 100 times (reciprocating operations). The rubbed printed matter was observed by naked eyes and evaluated according to the following ratings.

(Evaluation Ratings)

○: No peeling occurred x: Peeling occurred

TABLE 5

| | | Glossy paper | | | Optical density | |
|---|---|---|---|---|---|---|
| | | Spreading of dot size (mPa · s) | Optical density Printed matter 1 | Rub fastness Printed matter 2 | Plain paper Optical density Printed matter 3 | difference (Printed matter 1 − Printed matter 3) |
| Example 1 | Ink 1 | 140 | 1.73 | ○ | 0.97 | 0.76 |
| Example 2 | Ink 2 | 125 | 1.74 | ○ | 0.97 | 0.77 |
| Example 3 | Ink 8 | 122 | 1.88 | ○ | 0.98 | 0.90 |
| Example 4 | Ink 9 | 148 | 1.73 | ○ | 0.97 | 0.76 |
| Example 5 | Ink 10 | 181 | 1.54 | ○ | 1.02 | 0.52 |
| Example 6 | Ink 11 | 132 | 1.82 | ○ | 1.02 | 0.80 |
| Example 7 | Ink 12 | 159 | 1.64 | ○ | 1.02 | 0.62 |
| Example 8 | Ink 13 | 174 | 1.63 | ○ | 1.01 | 0.62 |
| Example 9 | Ink 14 | 150 | 1.67 | ○ | 0.97 | 0.70 |

TABLE 5-continued

|  |  | Glossy paper | | | Plain paper Optical density Printed matter 3 | Optical density difference (Printed matter 1 − Printed matter 3) |
|---|---|---|---|---|---|---|
|  |  | Spreading of dot size (mPa·s) | Optical density Printed matter 1 | Rub fastness Printed matter 2 | | |
| Example 10 | Ink 15 | 148 | 1.64 | ○ | 0.97 | 0.67 |
| Example 11 | Ink 16 | 170 | 1.58 | ○ | 0.98 | 0.60 |
| Example 12 | Ink 17 | 121 | 1.69 | ○ | 1.09 | 0.60 |
| Example 13 | Ink 18 | 185 | 1.50 | ○ | 0.96 | 0.54 |
| Example 14 | Ink 19 | 103 | 1.95 | ○ | 1.11 | 0.84 |
| Example 15 | Ink 20 | 120 | 1.70 | ○ | 0.97 | 0.73 |
| Comparative Example 1 | Ink 3 | 290 | 1.36 | ○ | 1.01 | 0.35 |
| Comparative Example 2 | Ink 4 | 135 | 1.90 | ○ | 0.92 | 0.98 |
| Comparative Example 3 | Ink 5 | 82 | 2.30 | ○ | 0.90 | 1.40 |
| Comparative Example 4 | Ink 6 | 242*[1] | 2.08 | ○ | 0.94 | 1.14 |
| Comparative Example 5 | Ink 7 | 122 | 2.31 | X | 0.98 | 1.33 |
| Comparative Example 6 | Ink 21 | 110 | 1.92 | X | 1.03 | 0.89 |
| Comparative Example 7 | Ink 22 | 127 | 2.02 | ○ | 0.90 | 1.12 |
| Comparative Example 8 | Ink 23 | 103 | 1.98 | ○ | 0.97 | 1.01 |

Note
*[1]Viscosity at a degree of concentration of 65%; not concentrated to 60%.

From Table 5, it was confirmed that the inks 1, 2 and 8 to 20 obtained in Examples 1 to 15 were excellent in spreading of the dot size when printed on a low-water absorbing recording medium (glossy paper), rust fastness, and optical density when printed on a low-water absorbing recording medium (glossy paper) and a high-water absorbing recording medium (plain paper), as compared to the inks 3 to 7 and 21 to 23 obtained in Comparative Examples 1 to 8.

In addition, it was confirmed that the inks 1, 2 and 8 to 20 obtained in Examples 1 to 15 had a small optical density difference when printed on a low-water absorbing recording medium and a high-water absorbing recording medium, and therefore the change in type of the recording medium as well as the change in printing conditions after the change in type of the recording medium were more facilitated, as compared to the inks 3 to 7 and 21 to 23 obtained in Comparative Examples 1 to 8. Accordingly, it is recognized that the water-based ink for ink-jet printing according to the present invention can be suitably used for an image forming method including the step A of forming images on a high-water absorbing recording medium and the step B of forming images on a low-water absorbing recording medium, in which the water-based ink used in the step A has the same composition as that of the water-based ink used in the step B, and an image forming method using an ink-jet printer equipped with a feeder of supplying a high-water absorbing recording medium and a feeder of supplying a low-water absorbing recording medium.

<Evaluation of Storage Stability of Ink>

The ink 20 (Example 15) obtained using the pigment water dispersion 10 subjected to the crosslinking treatment, and the ink 1 (Example 1) obtained using the pigment water dispersion 1 subjected to no crosslinking treatment were evaluated for storage stability by the following method.

A 50 cc screw vial was filled with 40 g of each of the inks and hermetically capped. The thus filled screw vial was placed and stored in a thermo-hygrostat "PR-3FT" available from Espec Corp. which was set to a temperature of 70° C. (no set value for humidity) for 2 weeks to determine the change between average particle sizes of the ink before and after the storage according to the following formula.

Rate of Change in Particle Size (%)=(Average Particle Size of Ink after Storage/Average Particle Size of Ink before Storage)×100

As a result, the ink 20 obtained in Example 15 and the ink 1 obtained in Example 1 both had an average particle size of 82 nm before the storage, and the rate of change in particle size of the ink 20 was 106% whereas the rate of change in particle size of the ink 1 was 117%. As the rate of change in particle size of the ink approaches 100%, the storage stability of the ink becomes more excellent. Therefore, it was confirmed that the ink obtained using the pigment water dispersion subjected to the crosslinking treatment was improved in storage stability as compared to the ink obtained using the pigment water dispersion subjected to no crosslinking treatment.

The invention claimed is:
1. A water-based ink for ink-jet printing, comprising pigment-containing water-insoluble polymer particles A, water-insoluble polymer particles B, an organic solvent C and water,
the water-insoluble polymer particles A being constituted of a water-insoluble polymer (a) comprising a constitutional unit derived from an ionic monomer (a-1), a constitutional unit derived from an aromatic ring-containing hydrophobic monomer (a-2) and a constitutional unit derived from a hydrophilic nonionic monomer (a-3) represented by the formula (1):

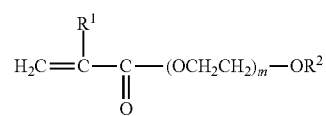

(1)

wherein R¹ is a hydrogen atom or a methyl group; R² is a hydrogen atom, an alkyl group having not less than 1 and not more than 20 carbon atoms or a phenyl group whose hydrogen atom may be substituted with an alkyl group having not less than 1 and not more than 9 carbon atoms; and m represents an average molar number of addition of ethyleneoxy groups and is a number of not less than 2 and not more than 6;

the constitutional unit derived from the hydrophilic nonionic monomer (a-3) being present in an amount of not less than 13% by mass and not more than 45% by mass on the basis of whole constitutional units in the water-insoluble polymer (a);

the water-insoluble polymer particles B contain no colorant;

the organic solvent C comprising one or more organic solvents having a boiling point of 90° C. or higher, in which a weighted mean boiling point of the organic solvent C which is weighted by contents (% by mass) of the respective organic solvents in the organic solvent C is 250° C. or lower; and a content of the organic solvent C in the water-based ink being not less than 20% by mass.

2. The water-based ink for ink-jet printing according to claim 1, wherein the organic solvent C comprises one or two compounds selected from the group consisting of a polyhydric alcohol and a polyhydric alcohol alkyl ether.

3. The water-based ink for ink-jet printing according to claim 1, wherein a content of the one or two compounds selected from the group consisting of a polyhydric alcohol and a polyhydric alcohol alkyl ether in the organic solvent C is not less than 80% by mass.

4. The water-based ink for ink-jet printing according to claim 1, wherein the organic solvent C comprises at least one compound selected from the group consisting of propylene glycol, diethylene glycol and dipropylene glycol monomethyl ether, and glycerol.

5. The water-based ink for ink-jet printing according to claim 1, wherein the aromatic ring-containing hydrophobic monomer (a-2) comprises at least one monomer selected from the group consisting of a styrene-based monomer, an aromatic group-containing (meth)acrylate and a styrene-based macromonomer.

6. The water-based ink for ink-jet printing according to claim 1, wherein the water-insoluble polymer (a) has a weight-average molecular weight of not less than 10,000 and not more than 150,000.

7. The water-based ink for ink-jet printing according to claim 1, wherein the pigment-containing water-insoluble polymer particles A have an average particle size of not less than 40 nm and not more than 150 nm.

8. The water-based ink for ink-jet printing according to claim 1, wherein a mass ratio of the pigment to the water-insoluble polymer (a) [pigment/water-insoluble polymer (a)] is from 30/70 to 90/10.

9. The water-based ink for ink-jet printing according to claim 1, wherein the water-insoluble polymer (a) is in the form of a crosslinked water-insoluble polymer.

10. The water-based ink for ink-jet printing according to claim 1, wherein a content of the organic solvent C in the water-based ink is not less than 20% by mass and not more than 60% by mass.

11. The water-based ink for ink-jet printing according to claim 1, wherein a content of the pigment-containing water-insoluble polymer particles A in the water-based ink is not less than 1% by mass and not more than 20% by mass.

12. The water-based ink for ink-jet printing according to claim 1, wherein a content of the water-insoluble polymer particles B in the water-based ink is not less than 1.0% by mass and not more than 10% by mass.

13. The water-based ink for ink-jet printing according to claim 1, wherein a mass ratio of the water-insoluble polymer particles B to the pigment [pigment/water-insoluble polymer particles B] is from 100/25 to 100/300.

14. An image forming method in which the water-based ink for ink-jet printing according to claim 1 is ejected onto an ink-jet recording medium to form images thereon, said method comprising:

Step A of forming images on a recording medium having a water absorption of not less than 10 g/m² as measured under the condition that a contact time between the recording medium and pure water is 100 ms; and Step B of forming images on a recording medium having a water absorption of not less than 0 g/m² and less than 10 g/m² as measured under the condition that a contact time between the recording medium and pure water is 100 ms, in which the water-based ink used in the step A has the same composition as that of the water-based ink used in the step B.

15. An image forming method in which the water-based ink for ink-jet printing according to claim 1 is ejected onto an ink-jet recording medium using an ink-jet printer to form images thereon, the ink-jet printer being equipped with a feeder for supplying a recording medium having a water absorption of not less than 10 g/m² as measured under the condition that a contact time between the recording medium and pure water is 100 ms, and a feeder for supplying a recording medium having a water absorption of not less than 0 g/m² and less than 10 g/m² as measured under the condition that a contact time between the recording medium and pure water is 100 ms.

16. An image forming method in which the water-based ink for ink-jet printing according to claim 1 is ejected onto an ink-jet recording medium to form images thereon, a difference between an optical density of a solid image printed on a recording medium having a water absorption of not less than 10 g/m² as measured under the condition that a contact time between the recording medium and pure water is 100 ms, and an optical density of a solid image printed on a recording medium having a water absorption of not less than 0 g/m² and less than 10 g/m² as measured under the condition that a contact time between the recording medium and pure water is 100 ms being not more than 0.90, as an absolute value thereof, when the solid images are formed using the same ink-jet printer and the water-based ink having the same composition.

17. The water-based ink for ink-jet printing according to claim 1, wherein a content of the water-insoluble polymer (a) in the water-based ink is not less than 0.5% by mass and not more than 6% by mass.

18. The water-based ink for ink-jet printing according to claim 4, wherein a total content propylene glycol and diethylene glycol in the water-based ink is not less than 15% by mass and not more than 55% by mass.

19. The water-based ink for ink-jet printing according to claim 4, wherein a total content of propylene glycol, diethylene glycol, dipropylene glycol monomethyl ether and glycerol in the water-based ink is not less than 30% by mass and not more than 60% by mass.

\* \* \* \* \*